US012764781B2

(12) United States Patent
Liu et al.

(10) Patent No.: US 12,764,781 B2
(45) Date of Patent: Oct. 13, 2026

(54) COMMUNICATION METHOD AND APPARATUS FOR RESOURCE CONFIGURATION

(71) Applicant: Huawei Technologies Co., Ltd., Shenzhen (CN)

(72) Inventors: Fengwei Liu, Chengdu (CN); Shitong Yuan, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 483 days.

(21) Appl. No.: 18/304,592

(22) Filed: Apr. 21, 2023

(65) Prior Publication Data

US 2023/0262755 A1 Aug. 17, 2023

Related U.S. Application Data

(63) Continuation of application No. PCT/CN2020/123445, filed on Oct. 23, 2020.

(51) Int. Cl.
*H04W 74/04* (2009.01)
*H04W 74/08* (2009.01)
(Continued)

(52) U.S. Cl.
CPC ....... *H04W 74/04* (2013.01); *H04W 74/0866* (2013.01); *H04W 74/0833* (2013.01); *H04W 74/0838* (2024.01)

(58) Field of Classification Search
CPC .......................... H04W 74/04; H04W 74/0866
(Continued)

(56) References Cited

U.S. PATENT DOCUMENTS

| | | | | |
|---|---|---|---|---|
| 10,827,440 | B2 * | 11/2020 | Wang | H04W 52/36 |
| 2021/0258948 | A1 * | 8/2021 | Abedini | H04W 72/54 |

(Continued)

FOREIGN PATENT DOCUMENTS

| | | | |
|---|---|---|---|
| CN | 110831187 | A | 2/2020 |
| EP | 4016939 | A1 | 6/2022 |

OTHER PUBLICATIONS

3GPP TS 38.331 V16.2.0 (Sep. 2020), 3rd Generation Partnership Project; Technical Specification Group Radio Access Network; NR; Radio Resource Control (RRC) protocol specification(Release 16), 921 pages.

(Continued)

*Primary Examiner* — Faisal Choudhury
(74) *Attorney, Agent, or Firm* — WOMBLE BOND DICKINSON (US) LLP

(57) ABSTRACT

This application provides a communication method and apparatus, to expect to better implement spatial multiplexing of an access link and a backhaul link of an IAB node. The method is applied to an MT of the IAB node. The method includes: obtaining transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and determining, according to a specified rule.

20 Claims, 6 Drawing Sheets

(51) Int. Cl.
*H04W 74/0833* (2024.01)
*H04W 74/0838* (2024.01)

(58) Field of Classification Search
USPC .......................................................... 370/329
See application file for complete search history.

(56) References Cited

U.S. PATENT DOCUMENTS

| | | | | |
|---|---|---|---|---|
| 2021/0377939 | A1* | 12/2021 | Chae | H04L 5/1469 |
| 2022/0256584 | A1* | 8/2022 | Ji | H04W 72/23 |
| 2023/0108413 | A1* | 4/2023 | You | H04W 72/20 370/329 |
| 2023/0276411 | A1* | 8/2023 | Choi | H04W 72/02 370/329 |

OTHER PUBLICATIONS

3GPP TS 38.213 V16.3.0 (Sep. 2020), 3rd Generation Partnership Project; Technical Specification Group Radio Access Network; NR; Physical layer procedures for control(Release 16), 179 pages.

* cited by examiner

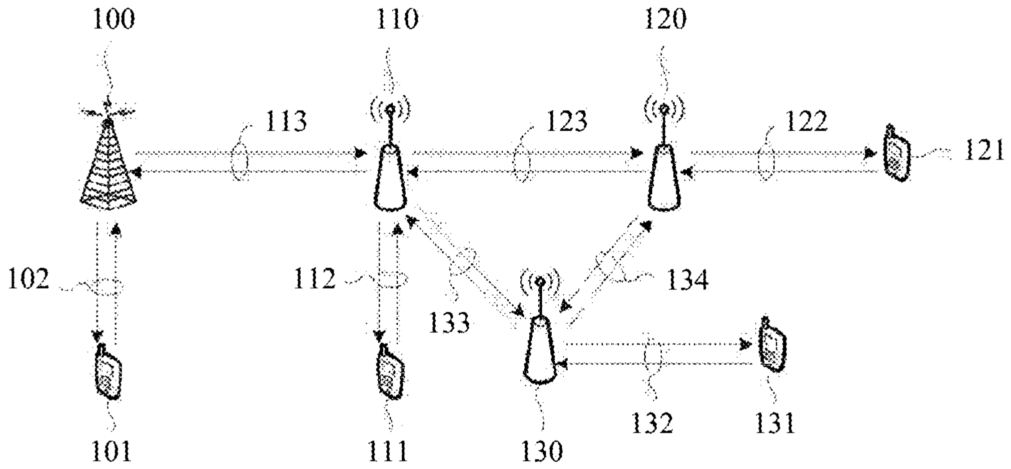
FIG. 1
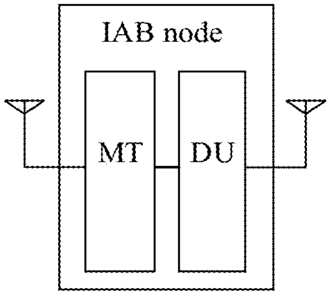
FIG. 2
| | | | | | | | | | |
|---|---|---|---|---|---|---|---|---|---|
| D | D | D | F | U | D | D | F | U | U |
FIG. 3
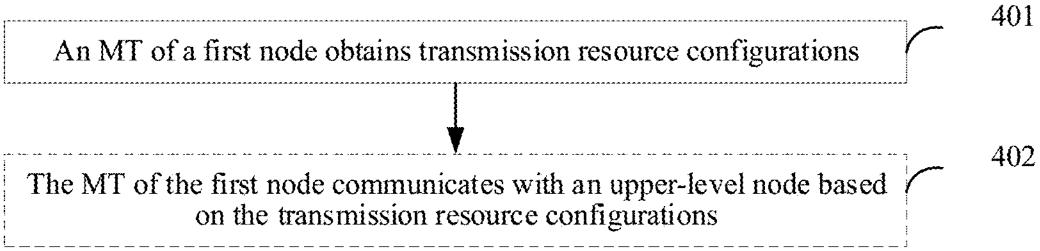
FIG. 4a

| | 0 | 1 | 2 | 3 | 4 | 5 | 6 | 7 | 8 | 9 |
|---|---|---|---|---|---|---|---|---|---|---|
| | TDD period | | | | | TDD period | | | | |
| First configuration | D | D | D | F | U | D | D | D | F | U |
| Second configuration | U | U | U | F | D | U | U | U | F | D |

| | 0 | 1 | 2 | 3 | 4 | 5 | 6 | 7 | 8 | 9 |
|---|---|---|---|---|---|---|---|---|---|---|
| | TDD period | | | | | TDD period | | | | |
| First configuration | D | D | D | F | U | D | D | D | F | U |
| Second configuration | | U | U | | D | | U | U | | D |

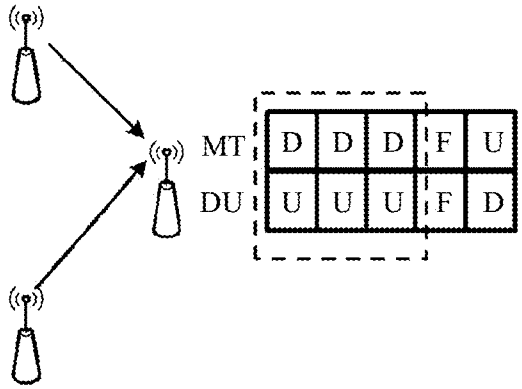
FIG. 5b
| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | TDD period | | | | | TDD period | | | | | TDD period | | | | | TDD period | | | | |
| First pattern | D | D | D | F | U | ~~D~~ | ~~D~~ | ~~D~~ | ~~F~~ | ~~U~~ | ~~D~~ | ~~D~~ | ~~D~~ | ~~F~~ | ~~U~~ | D | D | D | F | U |
| Second pattern | | ~~U~~ | ~~U~~ | | ~~D~~ | | U | U | | D | | U | U | | D | | ~~U~~ | ~~U~~ | | ~~D~~ |
FIG. 6
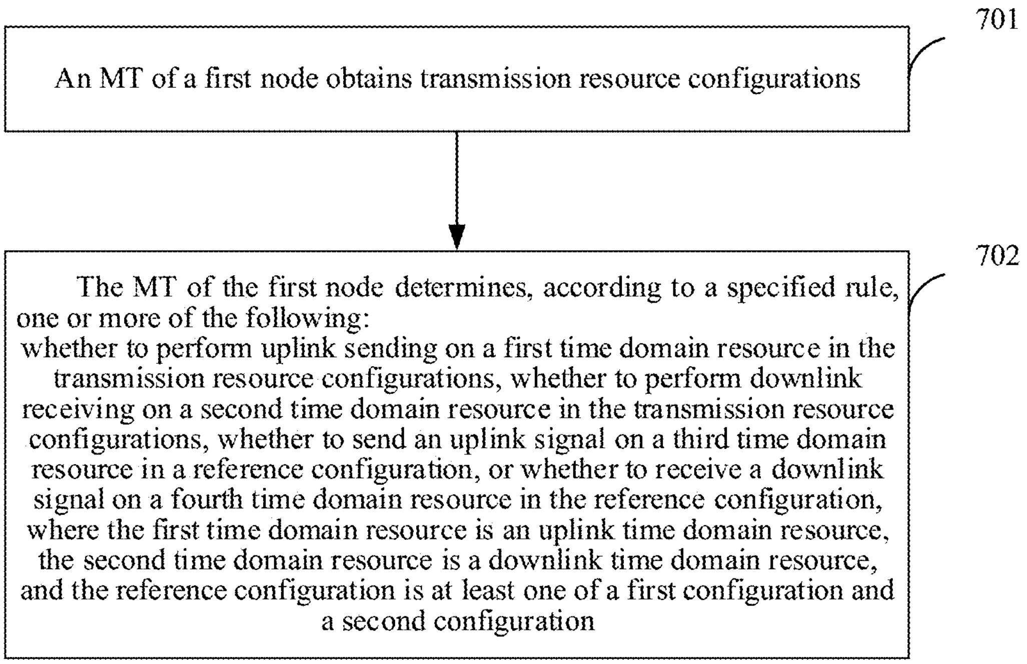
FIG. 7

| | 0 | 1 | 2 | 3 | 4 | 5 | 6 | 7 | 8 | 9 |
|---|---|---|---|---|---|---|---|---|---|---|
| | TDD period | | | | | TDD period | | | | |
| First configuration | D | D | D | F | U | D | D | D | F | U |
| SFI indicator | D | D | D | D F | U | D | D | D | F U | U |

COMMUNICATION METHOD AND APPARATUS FOR RESOURCE CONFIGURATION

CROSS-REFERENCE TO RELATED APPLICATIONS

This application is a continuation of International Application No. PCT/CN2020/123445, filed on Oct. 23, 2020, the disclosure of which is hereby incorporated by reference in its entirety.

TECHNICAL FIELD

This application relates to the field of communication technologies, and in particular, to a communication method and apparatus.

BACKGROUND

An integrated access and backhaul (IAB) node includes two modules: a mobile terminal (MT) and a distributed unit (DU). The MT of the IAB node may obtain a time division duplex (TDD)-uplink-downlink common configuration (UL-DL-configuration common) from a broadcast message. The TDD-uplink-downlink common configuration includes a quantity of downlink slots and a quantity of uplink slots. In one configuration period, a quantity of downlink slots indicates a quantity of consecutive slots that are counted from the first slot, and a quantity of uplink slots indicates a quantity of consecutive slots that are counted backward from the last slot. In other words, the TDD-uplink-downlink common configuration indicates that one configuration period starts with a downlink slot and/or ends with an uplink slot.

The IAB node integrates a wireless access link and a wireless backhaul link. The wireless access link is a communication link between user equipment (UE) and the IAB node, and the wireless backhaul link is a communication link between IAB nodes and a communication link between the IAB node and an IAB donor and is used for data backhaul. The wireless access link may be an access link for short, and the wireless backhaul link may be a backhaul link for short. In-band relay is a relay solution in which the backhaul link and the access link share a same frequency domain resource. The IAB node may have a half-duplex constraint. When receiving a downlink signal sent by an upper-level node of the IAB node, the IAB node cannot send a downlink signal to a lower-level node of the IAB node, and when receiving an uplink signal sent by a lower-level node of a relay node, the relay node cannot send an uplink signal to an upper-level node of the relay node.

The access link and the backhaul link implement spatial multiplexing, so that resource utilization can be improved. That the access link and the backhaul link of the IAB node implement spatial multiplexing indicates that when the DU performs downlink sending, the MT performs uplink sending; or when the DU performs uplink receiving, the MT performs downlink receiving. However, if both the access link and the backhaul link of the IAB node perform resource multiplexing by using the TDD-uplink-downlink common configuration, spatial multiplexing of the access link and the backhaul link cannot be implemented under the half-duplex constraint. For example, if the MT of the IAB node supports only a start with a downlink time domain resource and an end with an uplink time domain resource in one configuration period, the MT of the IAB node can receive downlink data only on a downlink time domain resource of the DU. Consequently, the IAB node both sends downlink data to a lower-level node and receives downlink data from an upper-level node on one time domain resource. This does not comply with the half-duplex constraint.

In conclusion, how to implement spatial multiplexing of the access link and the backhaul link of the IAB node is a problem that needs to be resolved.

SUMMARY

This application provides a communication method and apparatus, to expect to better implement spatial multiplexing of an access link and a backhaul link of an IAB node.

In some embodiments, a communication method is provided, including: obtaining transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and determining, according to a specified rule, one or more of the following: whether to perform uplink sending on a first time domain resource in the transmission resource configurations, whether to perform downlink receiving on a second time domain resource in the transmission resource configurations, whether to send an uplink signal on a third time domain resource in a reference configuration, or whether to receive a downlink signal on a fourth time domain resource in the reference configuration, where the first time domain resource is an uplink time domain resource, the second time domain resource is a downlink time domain resource, and the reference configuration is at least one of the first configuration and the second configuration.

The method may be performed by a first node or an MT of the first node, or may be performed by a chip or a functional unit in the first node. The first node may be an IAB node, a relay node, or any relay device.

In some embodiments, when the transmission resource configurations include the first configuration and the second configuration, the MT of the first node may determine that the MT of the first node should receive or send a signal. Opposite transmission directions may be configured in the first configuration and the second configuration, and resource positions of some signals/channels are valid in only a transmission direction. Therefore, when there are two transmission resource configurations and different transmission directions are separately configured in the two transmission resource configurations, the MT of the first node determines, depending on the specified rule, whether a transmission resource of a signal/channel on a time domain resource is valid. According to the specified rule, the MT of the first node and an upper-level node can reach an agreement on an understanding of a sending position or a receiving position of a signal, so that the MT of the first node and the upper-level node reach an agreement on an understanding of an uplink/a downlink transmission position, thereby avoiding a resource conflict or interference caused when understandings are inconsistent.

The first configuration may be understood as a TDD-uplink-downlink common configuration and/or a TDD-uplink-downlink dedicated configuration (TDD-UL-DL-dedicated), and the second configuration may be understood as an IAB-node-dedicated transmission resource configuration (TDD-UL-DL-dedicated-IAB-MT).

In some embodiments, the determining, according to a specified rule, whether to send an uplink signal on a third time domain resource in a reference configuration includes: determining, based on the reference configuration and a resource position of the uplink signal, whether to send the uplink signal on the third time domain resource in the reference configuration. In some embodiments, the specified rule includes: when the third time domain resource in the reference configuration is an uplink time domain resource at the resource position of the uplink signal, the uplink signal is allowed to be sent on the third time domain resource; and/or when the third time domain resource in the reference configuration is a downlink time domain resource at the resource position of the uplink signal, the uplink signal is not sent on the third time domain resource.

In some embodiments, the determining, according to a specified rule, whether to receive a downlink signal on a fourth time domain resource in the reference configuration includes: determining, based on the reference configuration and a resource position of the downlink signal, whether to receive the downlink signal on the fourth time domain resource in the reference configuration. In some embodiments, the specified rule includes: when the fourth time domain resource in the reference configuration is a downlink time domain resource at the resource position of the downlink signal, the downlink signal is allowed to be received on the fourth time domain resource; and/or when the fourth time domain resource in the reference configuration is an uplink time domain resource at the resource position of the downlink signal, the downlink signal is not received on the fourth time domain resource.

In some embodiments, when it is determined, according to the specified rule, whether to perform uplink sending on the first time domain resource in the transmission resource configurations, the specified rule includes: when the first time domain resource is located at the resource position of the downlink signal, uplink sending is not performed on the first time domain resource. For a cell-level downlink signal, because the downlink signal usually needs to be periodically scanned and sent in an entire cell, UE needs to receive the downlink signal. To reduce resource overheads of the upper-level node, the IAB MT should also be able to measure or receive a potential SSB signal. Therefore, the IAB MT does not perform uplink sending at the resource position of the downlink signal, and can receive the potential SSB signal.

When the first time domain resource is not located at the resource position of the downlink signal, uplink sending is allowed to be performed on the first time domain resource.

In some embodiments, when it is determined, according to the specified rule, whether to perform downlink receiving on the second time domain resource in the transmission resource configurations, the specified rule includes: when the second time domain resource is located at the resource position of the uplink signal, downlink receiving is not performed on the second time domain resource. When uplink signal resources are periodic and shared by UE, that is, the UE also needs to use these uplink signal resources, to reduce resource overheads of the upper-level node, the IAB MT should also be able to use these uplink signal resources. Therefore, the IAB MT does not perform downlink receiving at the resource position of the uplink signal, and can use an uplink signal resource to send the uplink signal.

In some embodiments, when it is determined, according to the specified rule, whether to perform downlink receiving on the second time domain resource in the transmission resource configurations, the specified rule includes: when the second time domain resource is not located at the resource position of the uplink signal, downlink receiving is performed on the second time domain resource.

In some embodiments, the downlink signal includes any one or more of the following: a channel state information-reference signal CSI-RS, a tracking reference signal TRS, a physical downlink control channel PDCCH search space, a control resource set, or a synchronization signal/physical broadcast channel SS/PBCH.

When the downlink signal includes any one or more of a CSI-RS, a TRS, a PDCCH search space, or a control resource set, the reference configuration complies with any one of the following: the reference configuration is the first configuration, the reference configuration is the second configuration, the reference configuration is the first configuration and the second configuration, or the reference configuration is indicated by the upper-level node. That the reference configuration is the first configuration and the second configuration indicates that when both the first configuration and the second configuration are downlink time domain resources at the position of the downlink signal, the downlink signal is allowed to be received.

When the downlink signal is an SS/PBCH, the reference configuration is the first configuration.

In some embodiments, the uplink signal includes a physical random access channel PRACH or a sounding reference signal SRS.

When the uplink signal is a PRACH, the reference configuration complies with any one of the following: the reference configuration is the first configuration, the reference configuration is the second configuration, the reference configuration is the first configuration and the second configuration, or the reference configuration is indicated by the upper-level node. That the reference configuration is the first configuration and the second configuration indicates that when both the first configuration and the second configuration are uplink time domain resources at the position of the uplink signal, the uplink signal is allowed to be sent.

When the uplink signal is an SRS, the reference configuration is the first configuration.

In some embodiments, a slot format indicator SFI is received, where an indication function of the SFI includes any one of the following: being used to indicate a flexible time domain resource in the first configuration, being used to indicate a flexible time domain resource in the second configuration, or being used to indicate the flexible time domain resource in the first configuration and the flexible time domain resource in the second configuration.

In some embodiments, the SFI includes an indication field, and the indication field is used to indicate the indication function of the SFI.

In some embodiments, the method further includes: receiving radio resource control RRC signaling from a donor node, where the RRC signaling includes the indication function of the SFI; or receiving medium access control MAC signaling from the upper-level node, where the MAC signaling includes the indication function of the SFI.

In some embodiments, if the SFI is used to indicate the flexible time domain resource in the first configuration and the flexible time domain resource in the second configuration, the SFI complies with any one or more of the following rules: when both the first configuration and the second configuration are downlink time domain resources on the first time domain resource, the SFI is not expected to indicate that the first time domain resource is an uplink time domain resource; when both the first configuration and the second configuration are uplink time domain resources on the second time domain resource, the SFI is not expected to indicate that the second time domain resource is a downlink time domain resource; or when the first configuration is an uplink time domain resource on the third time domain resource and the second configuration is a downlink time domain resource on the third time domain resource, or when the first configuration is a downlink time domain resource on the third time domain resource and the second configuration is an uplink time domain resource on the third time domain resource, the SFI is not expected to indicate that the third time domain resource is a flexible time domain resource.

In some embodiments, a communication method is provided, including: obtaining transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and receiving a slot format indicator SFI, where an indication function of the SFI includes any one of the following: being used to indicate a flexible time domain resource in the first configuration, being used to indicate a flexible time domain resource in the second configuration, or being used to indicate the flexible time domain resource in the first configuration and the flexible time domain resource in the second configuration. By using the indication function of the SFI, an MT of a first node may determine a configuration that the SFI is used to indicate.

The method may be performed by the first node or the MT of the first node, or may be performed by a chip or a functional unit in the first node. The first node may be an IAB node, a relay node, or any relay device.

In some embodiments, the SFI includes an indication field, and the indication field is used to indicate the indication function of the SFI.

In some embodiments, the method further includes: receiving radio resource control RRC signaling from a donor node, where the RRC signaling includes the indication function of the SFI; or receiving medium access control MAC signaling from an upper-level node, where the MAC signaling includes the indication function of the SFI.

In some embodiments, if the SFI is used to indicate the flexible time domain resource in the first configuration and the flexible time domain resource in the second configuration, the SFI complies with any one or more of the following rules: when both the first configuration and the second configuration are downlink time domain resources on the first time domain resource, the SFI is not expected to indicate that the first time domain resource is an uplink time domain resource; when both the first configuration and the second configuration are uplink time domain resources on the second time domain resource, the SFI is not expected to indicate that the second time domain resource is a downlink time domain resource; or when the first configuration is an uplink time domain resource on the third time domain resource and the second configuration is a downlink time domain resource on the third time domain resource, or when the first configuration is a downlink time domain resource on the third time domain resource and the second configuration is an uplink time domain resource on the third time domain resource, the SFI is not expected to indicate that the third time domain resource is a flexible time domain resource.

In some embodiments, a communication method is provided, including: an MT determines, based on a second configuration and an IAB-dedicated uplink signal configuration, whether to send an uplink signal on a time domain resource in the second configuration; and/or the MT determines, based on the second configuration and an IAB-dedicated downlink signal configuration, whether to receive a downlink signal on a time domain resource in the second configuration.

The method may be performed by a first node or the MT of the first node, or may be performed by a chip or a functional unit in the first node. The first node may be an IAB node, a relay node, or any relay device.

In some embodiments, the MT determines, based on the second configuration and an IAB-dedicated SSB signal configuration, whether to receive an SSB on a time domain resource in the second configuration.

In some embodiments, when the time domain resource in the second configuration is a downlink time domain resource at a resource position of the SSB, the IAB MT can receive the SSB; or when the time domain resource in the second configuration is an uplink time domain resource at the resource position of the SSB, the IAB MT does not perform uplink sending.

In some embodiments, the MT determines, based on the second configuration and a resource position of a PRACH, whether to send the PRACH (IAB-dedicated PRACH) on a time domain resource in the second configuration.

When the time domain resource in the second configuration is an uplink time domain resource at the resource position of the PRACH, the PRACH is allowed to be sent; or when the time domain resource in the second configuration is a downlink time domain resource at the resource position of the PRACH, the PRACH is not sent.

In some embodiments, a communication apparatus is provided. The communication apparatus may be a first node, may be an MT of the first node, or may be an apparatus located in the MT of the first node or an apparatus that can be used in matching with the MT of the first node. In some embodiments, the apparatus may include respectively corresponding modules for performing the methods/operations/steps/actions. The module may be implemented by using a hardware circuit, software, or a combination of a hardware circuit and software. In some embodiments, the apparatus may include an obtaining module and a determining module. For example, the obtaining module is configured to obtain transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and the determining module is configured to determine, according to a specified rule, one or more of the following: whether to perform uplink sending on a first time domain resource in the transmission resource configurations, whether to perform downlink receiving on a second time domain resource in the transmission resource configurations, whether to send an uplink signal on a third time domain resource in a reference configuration, or whether to receive a downlink signal on a fourth time domain resource in the reference configuration, where the first time domain resource is an uplink time domain resource, the second time domain resource is a downlink time domain resource, and the reference configuration is at least one of the first configuration and the second configuration.

In some embodiments, when determining, according to the specified rule, whether to send the uplink signal on the third time domain resource in the reference configuration, the determining module is configured to determine, based on the reference configuration and a resource position of the uplink signal, whether to send the uplink signal on the third time domain resource in the reference configuration.

In some embodiments, the specified rule includes: when the third time domain resource in the reference configuration is an uplink time domain resource at the resource position of the uplink signal, the uplink signal is allowed to be sent on the third time domain resource; and/or when the third time domain resource in the reference configuration is a downlink time domain resource at the resource position of the uplink signal, the uplink signal is not sent on the third time domain resource.

In some embodiments, when determining, according to the specified rule, whether to receive the downlink signal on the fourth time domain resource in the reference configuration, the determining module is configured to determine, based on the reference configuration and a resource position of the downlink signal, whether to receive the downlink signal on the fourth time domain resource in the reference configuration.

In some embodiments, the specified rule includes: when the fourth time domain resource in the reference configuration is a downlink time domain resource at the resource position of the downlink signal, the downlink signal is allowed to be received on the fourth time domain resource; and/or when the fourth time domain resource in the reference configuration is an uplink time domain resource at the resource position of the downlink signal, the downlink signal is not received on the fourth time domain resource.

In some embodiments, the specified rule includes: when the first time domain resource is located at the resource position of the downlink signal, uplink sending is not performed on the first time domain resource; and/or when the first time domain resource is not located at the resource position of the downlink signal, uplink sending is allowed to be performed on the first time domain resource.

In some embodiments, the specified rule includes: when the second time domain resource is located at the resource position of the uplink signal, downlink receiving is not performed on the second time domain resource; and/or when the second time domain resource is not located at the resource position of the uplink signal, downlink receiving is performed on the second time domain resource.

In some embodiments, the downlink signal includes any one or more of the following: a channel state information-reference signal CSI-RS, a tracking reference signal TRS, a physical downlink control channel PDCCH search space, a control resource set, or a synchronization signal/physical broadcast channel SS/PBCH.

In some embodiments, when the downlink signal includes any one or more of a CSI-RS, a TRS, a PDCCH search space, or a control resource set, the reference configuration complies with any one of the following: the reference configuration is the first configuration, the reference configuration is the second configuration, the reference configuration is the first configuration and the second configuration, or the reference configuration is indicated by an upper-level node; or when the downlink signal is an SS/PBCH, the reference configuration is the first configuration.

In some embodiments, when the reference configuration is the first configuration and the second configuration, when both the first configuration and the second configuration are downlink time domain resources at the position of the downlink signal, the downlink signal is allowed to be received.

In some embodiments, the uplink signal includes a physical random access channel PRACH or a sounding reference signal SRS.

In some embodiments, when the uplink signal is a PRACH, the reference configuration complies with any one of the following: the reference configuration is the first configuration, the reference configuration is the second configuration, the reference configuration is the first configuration and the second configuration, or the reference configuration is indicated by an upper-level node; or when the uplink signal is an SRS, the reference configuration is the first configuration.

In some embodiments, when the reference configuration is the first configuration and the second configuration, when both the first configuration and the second configuration are uplink time domain resources at the position of the uplink signal, the uplink signal is allowed to be sent.

In some embodiments, the apparatus further includes: a communication module, configured to receive a slot format indicator SFI, where an indication function of the SFI includes any one of the following: being used to indicate a flexible time domain resource in the first configuration, being used to indicate a flexible time domain resource in the second configuration, or being used to indicate the flexible time domain resource in the first configuration and the flexible time domain resource in the second configuration.

In some embodiments, the SFI includes an indication field, and the indication field is used to indicate the indication function of the SFI.

In some embodiments, the communication module is further configured to: receive radio resource control RRC signaling from a donor node, where the RRC signaling includes the indication function of the SFI; or receive medium access control MAC signaling from the upper-level node, where the MAC signaling includes the indication function of the SFI.

In some embodiments, if the SFI is used to indicate the flexible time domain resource in the first configuration and the flexible time domain resource in the second configuration, the SFI complies with any one or more of the following rules: when both the first configuration and the second configuration are downlink time domain resources on the first time domain resource, the SFI is not expected to indicate that the first time domain resource is an uplink time domain resource; when both the first configuration and the second configuration are uplink time domain resources on the second time domain resource, the SFI is not expected to indicate that the second time domain resource is a downlink time domain resource; or when the first configuration is an uplink time domain resource on the third time domain resource and the second configuration is a downlink time domain resource on the third time domain resource, or when the first configuration is a downlink time domain resource on the third time domain resource and the second configuration is an uplink time domain resource on the third time domain resource, the SFI is not expected to indicate that the third time domain resource is a flexible time domain resource.

In some embodiments, a communication apparatus is provided. The communication apparatus may be a first node, may be an MT of the first node, or may be an apparatus located in the MT of the first node or an apparatus that can be used in matching with the MT of the first node. In some embodiments, the apparatus may include respectively corresponding modules for performing the methods/operations/steps/actions described herein. The module may be implemented by using a hardware circuit, software, or a combination of a hardware circuit and software. In some embodiments, the apparatus may include an obtaining module and a communication module. For example, the obtaining module is configured to obtain transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and the communication module is configured to receive a slot format indicator SFI, where an indication function of the SFI includes any one of the following: being used to indicate a flexible time domain resource in the first configuration, being used to indicate a flexible time domain resource in the second configuration, or being used to indicate the flexible time domain resource in the first configuration and the flexible time domain resource in the second configuration.

In some embodiments, the SFI includes an indication field, and the indication field is used to indicate the indication function of the SFI.

In some embodiments, the communication module is further configured to: receive radio resource control RRC signaling from a donor node, where the RRC signaling includes the indication function of the SFI; or receive medium access control MAC signaling from an upper-level node, where the MAC signaling includes the indication function of the SFI.

In some embodiments, if the SFI is used to indicate the flexible time domain resource in the first configuration and the flexible time domain resource in the second configuration, the SFI complies with any one or more of the following rules: when both the first configuration and the second configuration are downlink time domain resources on the first time domain resource, the SFI is not expected to indicate that the first time domain resource is an uplink time domain resource; when both the first configuration and the second configuration are uplink time domain resources on the second time domain resource, the SFI is not expected to indicate that the second time domain resource is a downlink time domain resource; or when the first configuration is an uplink time domain resource on the third time domain resource and the second configuration is a downlink time domain resource on the third time domain resource, or when the first configuration is a downlink time domain resource on the third time domain resource and the second configuration is an uplink time domain resource on the third time domain resource, the SFI is not expected to indicate that the third time domain resource is a flexible time domain resource.

In some embodiments, a communication apparatus is provided. The communication apparatus may be a first node, may be an MT of the first node, or may be an apparatus located in the MT of the first node or an apparatus that can be used in matching with the MT of the first node. In some embodiments, the apparatus may include respectively corresponding modules for performing the methods/operations/steps/actions described herein. The module may be implemented by using a hardware circuit, software, or a combination of a hardware circuit and software. In some embodiments, the apparatus may include a processing module, configured to determine, based on a second configuration and an IAB-dedicated uplink signal configuration, whether to send an uplink signal on a time domain resource in the second configuration; and/or configured to determine, based on the second configuration and an IAB-dedicated downlink signal configuration, whether to receive a downlink signal on a time domain resource in the second configuration.

In some embodiments, the processing module is configured to determine, based on the second configuration and an IAB-dedicated SSB signal configuration, whether to receive an SSB on a time domain resource in the second configuration.

In some embodiments, when the time domain resource in the second configuration is a downlink time domain resource at a resource position of the SSB, the IAB MT can receive the SSB; or when the time domain resource in the second configuration is an uplink time domain resource at the resource position of the SSB, the IAB MT does not perform uplink sending.

In some embodiments, the processing module is configured to determine, based on the second configuration and a resource position of a PRACH, whether to send the PRACH (IAB-dedicated PRACH) on a time domain resource in the second configuration.

In some embodiments, when the time domain resource in the second configuration is an uplink time domain resource at the resource position of the PRACH, the PRACH is allowed to be sent; or when the time domain resource in the second configuration is a downlink time domain resource at the resource position of the PRACH, the PRACH is not sent.

In some embodiments, this application provides a communication apparatus. The communication apparatus includes a memory and a processor. The memory is configured to store a program, instructions, or data invoked by the processor. The memory is coupled to the processor, or the processor includes the memory. When executing the program, instructions, or data stored in the memory, the processor may implement the methods described here.

In some embodiments, the communication apparatus further includes a communication interface. The communication interface is used by the apparatus to communicate with another device, for example, send/receive data or a signal. For example, the communication interface may be a transceiver, a circuit, a bus, a module, or a communication interface of another type, and the other device may be a second node.

In some embodiments, this application provides a communication apparatus. The communication apparatus includes a memory and a processor. The memory is configured to store a computer program, instructions, or data. The memory is coupled to the processor, or the processor includes the memory. When executing the program, instructions, or data stored in the memory, the processor may implement the methods described herein.

In some embodiments, the communication apparatus further includes a communication interface. The communication interface is used by the apparatus to communicate with another device, for example, send/receive data or a signal. For example, the communication interface may be a transceiver, a circuit, a bus, a module, or a communication interface of another type, and the other device may be a second node.

In some embodiments, this application provides a communication apparatus. The communication apparatus includes a memory and a processor. The memory is configured to store a computer program, instructions, or data. The memory is coupled to the processor, or the processor includes the memory. When executing the program, instructions, or data stored in the memory, the processor may implement the methods described herein.

In some embodiments, the communication apparatus further includes a communication interface. The communication interface is used by the apparatus to communicate with another device, for example, send/receive data or a signal. For example, the communication interface may be a transceiver, a circuit, a bus, a module, or a communication interface of another type, and the other device may be a second node.

In some embodiments, this application further provides a computer-readable storage medium. The computer storage medium stores computer-readable instructions. When the computer-readable instructions are run on a computer, the method according to any one of the embodiments enabled to be implemented.

In some embodiments, this application further provides a computer-readable storage medium, including a computer program or instructions. When the computer program is or the instructions are run on a computer, the method according to any one of the embodiments is enabled to be implemented.

In some embodiments, this application further provides a computer-readable storage medium, including a computer program or instructions. When the computer program is or the instructions are run on a computer, the method according to any one of the embodiments is enabled to be implemented.

In some embodiments, this application provides a chip system. The chip system includes a processor, and the processor executes a computer program or instructions stored in a memory, to enable the method according to any one of the embodiments to be implemented. The chip system may include a chip, or may include a chip and another discrete device.

In some embodiments, the processor includes the memory, or the processor is coupled to the memory.

In some embodiments, this application provides a chip system. The chip system includes a processor, and the processor executes a computer program or instructions in a memory, to enable the method according to any one of the embodiments to be implemented. The chip system may include a chip, or may include a chip and another discrete device.

In some embodiments, the processor includes the memory, or the processor is coupled to the memory.

In some embodiments, this application provides a chip system. The chip system includes a processor, and the processor executes a computer program or instructions in a memory, to enable the method according to any one of the embodiments to be implemented. The chip system may include a chip, or may include a chip and another discrete device.

In some embodiments, the processor includes the memory, or the processor is coupled to the memory.

In some embodiments, this application further provides a computer program product, including a computer program or instructions. When the computer program is or the instructions are run on a computer, the method according to any one of the embodiments is enabled to be performed.

In some embodiments, this application provides a communication system. The communication system includes an MT of a first node and a second node, and the MT of the first node is configured to perform the methods described herein.

BRIEF DESCRIPTION OF DRAWINGS

FIG. 1 is a schematic diagram of a structure of a communication system according to an embodiment of this application;

FIG. 2 is a schematic diagram of a structure of an IAB node according to an embodiment of this application;

FIG. 3 is a schematic diagram of a TDD-uplink-downlink common configuration according to an embodiment of this application;

FIG. 4*a* is a schematic flowchart of a first communication method according to an embodiment of this application;

FIG. 5*b* is a second schematic diagram of spatial multiplexing of an MT and a DU according to an embodiment of this application;

FIG. 6 is a schematic diagram of two working patterns of a DU of an upper-level node according to an embodiment of this application;

FIG. 7 is a schematic flowchart of a second communication method according to an embodiment of this application;

DESCRIPTION OF EMBODIMENTS

Figures 4B, 4C, 5A:
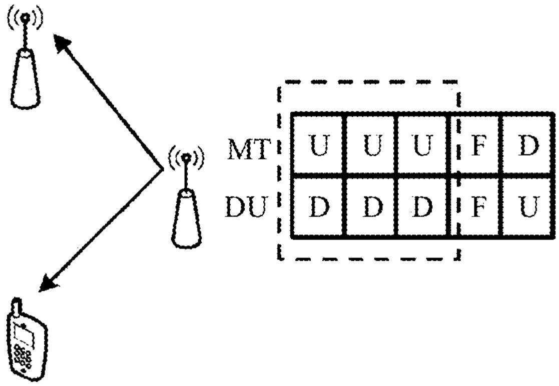
FIG. 4*b* is a first schematic diagram of a first configuration and a second configuration according to an embodiment of this application.
FIG. 4*c* is a second schematic diagram of a first configuration and a second configuration according to an embodiment of this application.
FIG. 5*a* is a first schematic diagram of spatial multiplexing of an MT and a DU according to an embodiment of this application.

Embodiments of this application provide a communication method and apparatus, to expect to better implement spatial multiplexing of an access link and a backhaul link of an IAB node. The method and the apparatus are based on a same technical idea. Because a problem-resolving principle of the method is similar to a problem-resolving principle of the apparatus, mutual reference may be made to implementation of the apparatus and the method. Repeated parts are not described again.

In description of the embodiments of this application, the term "and/or" describes an association relationship between associated objects and indicates that three relationships may exist. For example, A and/or B may indicate the following three cases: Only A exists, both A and B exist, and only B exists. "A plurality of" in this application means two or more. In addition, it should be understood that in description of this application, words such as “first” and “second” are merely used for distinguishing description, and cannot be understood as an indication or implication of relative importance or an indication or implication of a sequence.

The communication method provided in the embodiments of this application may be applied to a 4th generation (4G) communication system such as a long term evolution (LTE) system, a 5th generation (5G) communication system such as a new radio (NR) system, or various future communication systems such as a 6th generation (6G) communication system.

The following describes in detail the embodiments of this application with reference to accompanying drawings.

FIG. 1 is a schematic diagram of a structure of an applicable communication system according to an embodiment of this application. In the communication system shown in FIG. 1, an IAB system is provided. One IAB system includes at least one base station 100, one or more terminals 101 served by the base station 100, one or more relay nodes (RN), and one or more terminals served by the relay node. In this embodiment of this application, the relay node may also be referred to as a relay device or a relay transmission and reception point (rTRP).

For example, the IAB system shown in FIG. 1 includes an rTRP 110, an rTRP 120, an rTRP 130, one or more terminals 111 served by the rTRP 110, one or more terminals 121 served by the rTRP 120, and one or more terminals 131 served by the rTRP 130. Usually, the base station 100 is referred to as a donor next generation NodeB (DgNB). The rTRP 110 is connected to the base station 100 by using a wireless backhaul link 113. The rTRP 120 is connected to the relay node rTRP 110 by using a wireless backhaul link 123, to access a network. The rTRP 130 is connected to the relay node rTRP 110 by using a wireless backhaul link 133, to access the network. The rTRP 120 serves the one or more terminals 121, and the rTRP 130 serves the one or more terminals 131. In FIG. 1, both the relay nodes rTRP 110 and rTRP 120 are connected to the network by using the wireless backhaul links. In this application, all the wireless backhaul links are viewed from a perspective of the relay nodes. For example, the wireless backhaul link 113 is a backhaul link of the relay node rTRP 110, and the wireless backhaul link 123 is a backhaul link of the relay node rTRP 120. As shown in FIG. 1, a relay node (for example, the relay node 120) may be connected to another relay node (for example, the relay node 110) by using a wireless backhaul link (for example, the wireless backhaul link 123), to be connected to the network. In addition, the relay node may be connected to the network by using a plurality of levels of wireless relay nodes.

In this embodiment of this application, the donor next generation NodeB may also be referred to as a donor node or an IAB donor. The base station includes but is not limited to an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a new radio base station (for example, a gNB), or the like.

It may be understood that the IAB system may alternatively include more or fewer relay nodes.

Usually, a node that provides a wireless backhaul link resource, for example, the relay node 110, is referred to as an upper-level node of the relay node 120, and the relay node 120 is referred to as a lower-level node of the relay node 110. Usually, the lower-level node may be considered as a terminal of the upper-level node. It should be understood that, in the IAB system shown in FIG. 1, one relay node is connected to one upper-level node. However, in a future relay system, to improve reliability of a wireless backhaul link, a plurality of upper-level nodes may simultaneously provide services for one relay node (for example, the relay node 120). For example, the rTRP 130 in FIG. 1 may be further connected to the relay node rTRP 120 by using a backhaul link 134, that is, both the rTRP 110 and the rTRP 120 are upper-level nodes of the rTRP 130. In this application, the terminal 101, the terminal 111, the terminal 121, and the terminal 131 each may be a static or mobile device. For example, the mobile device may be a mobile phone, an intelligent terminal, a tablet computer, a notebook computer, a video game console, or a multimedia player, or even a mobile relay node. The static device is usually located at a fixed position, for example, a computer, or an access point (connected to a network by using a wireless link, for example, a static relay node). Names of the relay nodes rTRPs 110, 120, and 130 are not limited in a scenario or a network in which the relay nodes rTRPs 110, 120, and 130 are deployed, and there may be any other name such as a relay or an RN. In this application, the rTRP is used merely for ease of description.

In FIG. 1, wireless links 102, 112, 122, 132, 113, 123, 133, and 134 each may be a bidirectional link, including uplink and downlink transmission links. Particularly, the wireless backhaul links 113, 123, 133, and 134 each may be used by an upper-level node to provide a service for a lower-level node, for example, used by the upper-level node 100 to provide a wireless backhaul service for the lower-level node 110. It should be understood that an uplink and a downlink of the backhaul link may be separated. To be specific, transmission is not performed on the uplink and the downlink by using a same node. Downlink transmission indicates that an upper-level node transmits information or data to a lower-level node. For example, the node 100 transmits information or data to the node 110. Uplink transmission indicates that a lower-level node transmits information or data to an upper-level node. For example, the node 110 transmits information or data to the node 100. The node is not limited to a network node or a terminal. For example, in a D2D scenario, a terminal may be used as a relay node to serve another terminal. In some scenarios, the wireless backhaul link may also be an access link. For example, the backhaul link 123 may also be considered as an access link for the node 110, and the backhaul link 113 is also an access link of the node 100. It should be understood that the upper-level node may be a base station or a relay node, and the lower-level node may be a relay node or a terminal having a relay function. For example, in a D2D scenario, the lower-level node may be alternatively a terminal.

In FIG. 1, the donor node is a node by using which a core network may be accessed; or is an anchor base station in a radio access network, where the network may be accessed by using the anchor base station. The anchor base station is responsible for data processing at a packet data convergence protocol (PDCP) layer; or is responsible for receiving data from a core network and forwarding the data to a relay node, or receiving data from the relay node and forwarding the data to the core network. The donor node may be usually connected to a network in a wired manner, for example, by using a fiber-optic cable.

Any relay node (or IAB node) includes two parts, configured to implement a similar function as a base station and a similar function as a terminal. Referring to FIG. 2, the IAB node may include two parts: a mobile terminal (MT) and a distributed unit (DU). The MT is a module configured to implement a similar function as a common terminal, and is configured to communicate with an upper-level node, for example, send uplink (UL) data to the upper-level node, or receive downlink (DL) data from the upper-level node. The DU is a module configured to implement a similar function as a common base station, and is configured to communicate with a lower-level node, for example, send downlink (DL) data to the lower-level node, or receive uplink (UL) data from the lower-level node.

Transmission resources of the MT of the IAB node may be classified into three types: downlink (D), uplink (U), and flexible (F). The three types of resources are also supported by the common terminal, and may be indicated by using signaling. Transmission directions of transmission resources of the DU of the IAB node may be classified into three types: uplink (U), downlink (D), and flexible (F). The resources of the DU may be further classified into three types: hard, soft, and not available. A hard resource of the DU indicates a resource that is always available to the DU, a soft resource of the DU indicates that whether the resource is available to the DU depends on an indication of an upper-level node, and a not available resource of the DU indicates a resource that is not available to the DU.

The common terminal (terminal for short) obtains a TDD-uplink-downlink common configuration (UL-DL-configuration common) from a broadcast message. The TDD-uplink-downlink common configuration includes a quantity of downlink slots/symbols and a quantity of uplink slots/symbols. In one configuration period, a quantity of downlink slots indicates a quantity of consecutive slots that are counted from the first slot, a quantity of uplink slots indicates a quantity of consecutive slots that are counted backward from the last slot, a quantity of downlink symbols indicates a quantity of consecutive symbols that are counted forward from the first symbol in a remaining slot that is not indicated, namely, a flexible slot, and a quantity of uplink symbols indicates a quantity of consecutive symbols that are counted backward from the last symbol in a remaining slot that is not indicated, namely, a flexible slot. All the symbols described herein are OFDM symbols in an OFDM system, and an absolute time length of the OFDM symbol is related to a subcarrier spacing. In other words, the TDD-uplink-downlink common configuration indicates that one configuration period starts with a downlink slot and ends with an uplink slot. After the terminal accesses a cell, a base station configures a TDD-uplink-downlink dedicated configuration (TDD-UL-DL-dedicated) by using radio resource control (RRC) signaling, to further indicate transmission directions of some "F" slots or symbols in the TDD configuration configured in the broadcast message. The MT of the IAB node can use a resource configuration method of the common terminal, that is, supports a start with a downlink time domain resource and an end with an uplink time domain resource in one configuration period. As shown in FIG. 3, according to the TDD-uplink-downlink common configuration, a configuration manner starts with D and ends with U is provided. In FIG. 3, one block may represent one slot. For example, five consecutive slots are used as one configuration period, and each configuration period starts with D and ends with U.

In this embodiment of this application, a unit time domain resource may be a slot, or may be a symbol or a time domain resource of another type. For ease of description, in one configuration period, "a start time domain resource is an uplink time domain resource" may be described as "starting with U", "an end time domain resource is a downlink time domain resource" may be described as "ending with D", "a start time domain resource is a downlink time domain resource" may be described as "starting with D", and "an end time domain resource is an uplink time domain resource" may be described as "ending with U".

In-band relay usually has a half-duplex constraint. In some embodiments, when receiving a downlink signal sent by an upper-level node of the IAB node, the IAB node cannot send a downlink signal to a lower-level node of the IAB node, and when receiving an uplink signal sent by a lower-level node of a relay node, the relay node cannot send an uplink signal to an upper-level node of the relay node. In one configuration period, the DU sends downlink data to a lower-level node or a terminal on a downlink time domain resource of the DU of the IAB node. That the DU and the MT of the IAB node implements spatial multiplexing indicates that when the DU performs downlink sending, the MT performs uplink sending; or when the DU performs uplink receiving, the MT performs downlink receiving. When the DU and the MT of the IAB node performs spatial multiplexing, the MT of the IAB node can receive or send data on a downlink time domain resource of the DU. However, if the MT of the IAB node supports only a start with a downlink time domain resource and an end with an uplink time domain resource in one configuration period, the MT of the IAB node can only receive downlink data on the downlink time domain resource of the DU. In this way, the IAB node sends downlink data to a lower-level node and also receives downlink data from an upper-level node on one time domain resource. Due to the half-duplex constraint, when receiving a downlink signal sent by an upper-level node of the IAB node, the IAB node cannot send a downlink signal to a lower-level node of the IAB node. Consequently, spatial multiplexing cannot be implemented.

In this embodiment of this application, an IAB-node-dedicated transmission resource configuration is provided for the IAB node, where a start with an uplink time domain resource and an end with a downlink time domain resource in one configuration period are supported. This helps implement spatial multiplexing of the access link and the backhaul link, that is, implement spatial multiplexing of the MT and the DU. The dedicated transmission resource configuration is defined as starting with an uplink time domain resource. The uplink time domain resource includes an uplink slot or an uplink symbol. Certainly, the dedicated transmission resource configuration may be alternatively defined as starting with a flexible time domain resource. The flexible time domain resource includes a flexible slot or a flexible symbol.

Based on the foregoing descriptions, the following describes a specific process of a first communication method in an embodiment of this application. The first communication method is a transmission resource configuration method.

In this embodiment of this application, a communication method is designed for a node, and an IAB node is used as an example of the node. In addition, an MT of the IAB node (IAB-MT) is used as an example for example description. It may be understood that descriptions in this embodiment may be correspondingly applied to a DU of the IAB node, due to consistent technical ideas.

Referring to FIG. 4*a*, in this embodiment of this application, the process of the first communication method is described as follows: The method is performed by an MT of a first node. The first node may be a base station, a relay node, an IAB node, a terminal having a relay function, or any device having a relay function.

S401: The MT of the first node obtains transmission resource configurations.

The MT of the first node may obtain the transmission resource configurations from a second node. In some embodiments, the second node sends the transmission resource configurations to the MT of the first node, and the MT of the first node receives the transmission resource configurations from the second node. The second node is an upper-level node of the first node, or the second node is a donor node. The second node may be a base station, a relay node, an IAB node, a terminal having a relay function, or any device having a relay function.

The second node may send the transmission resource configurations to the first node by using messages of a plurality of types. A first configuration and a second configuration may be carried in same signaling, or may be carried in different signaling. In an optional manner, the first configuration is carried by using a broadcast message. The second node sends the broadcast message to the MT of the first node, where the broadcast message carries the first configuration. The MT of the first node listens for the broadcast message to obtain the first configuration. The second configuration is carried by using an RRC message. The second node sends the RRC message to the MT of the first node, where the RRC message carries the second configuration. The MT of the first node receives the RRC message to obtain the second configuration. In another optional manner, both the first configuration and the second configuration have semi-static resources and are carried by using an RRC message. The second node sends the RRC message to the first node, where the RRC message carries the first configuration and the second configuration. The first node receives the RRC message to obtain the first configuration and the second configuration.

The transmission resource configurations include the first configuration and the second configuration. The "configuration" in the first configuration and the second configuration may be a time domain resource configuration, for example, a slot configuration. The "configuration" in the first configuration and the second configuration may be understood as a pattern. In this case, the first configuration may also be referred to as a first pattern, and the second configuration may also be referred to as a second pattern.

The first configuration indicates that a start time domain resource is a downlink time domain resource in one configuration period, indicates that an end time domain resource is an uplink time domain resource in one configuration period, or indicates that a start time domain resource is a downlink time domain resource and an end time domain resource is an uplink time domain resource in one configuration period.

The second configuration indicates that a start time domain resource is an uplink time domain resource in one configuration period, indicates that an end time domain resource is a downlink time domain resource in one configuration period, or indicates that a start time domain resource is an uplink time domain resource and an end time domain resource is a downlink time domain resource in one configuration period.

The first configuration may be understood as a TDD-uplink-downlink common configuration and/or a TDD-uplink-downlink dedicated configuration (TDD-UL-DL-dedicated), and the second configuration may be understood as an IAB-node-dedicated transmission resource configuration (TDD-UL-DL-dedicated-IAB-MT). The IAB-node-dedicated transmission resource configuration may also be an IAB-node-dedicated configuration for short.

In some embodiments, S402 may be further included.

S402: The MT of the first node communicates with the upper-level node based on the transmission resource configurations.

The first configuration and the second configuration help implement spatial multiplexing of the IAB node. The following uses schematic diagrams of FIG. 5*a* and FIG. 5*b* for description.

The following describes transmission directions of the first configuration and the second configuration by using an example. Two TDD periods (configuration periods) are used as an example. One TDD period includes five time domain resources. Sequence numbers of time domain resources in the first TDD period are 0 to 4, and sequence numbers of time domain resources in the second TDD period are 5 to 9.

As shown in FIG. 4*b*, transmission directions of the first configuration on transmission resources in one configuration period are DDDFU, that is, transmission directions of the first configuration on the time domain resources 0 to 4 are respectively DDDFU, and transmission directions of the first configuration on the time domain resources 5 to 9 are respectively DDDFU. Transmission directions of the second configuration on transmission resources in one configuration period may be represented as UUUFD, that is, transmission directions of the second configuration on the time domain resources 0 to 4 are respectively UUUFD, and transmission directions of the second configuration on the time domain resources 5 to 9 are respectively UUUFD.

As shown in FIG. 4*c*, transmission directions of the first configuration on transmission resources in one configuration period are DDDFU, that is, transmission directions of the first configuration on the time domain resources 0 to 4 are respectively DDDFU, and transmission directions of the first configuration on the time domain resources 5 to 9 are respectively DDDFU. Transmission directions of the second configuration on transmission resources in one configuration period may be represented as _UU_D, where "_" indicates null and means a hard resource of the DU of the IAB node. In this example, it is assumed that the IAB node does not have a multiplexing capability of simultaneously performing sending and receiving on the MT and the DU. Therefore, the MT of the IAB node does not expect to be scheduled for transmission at a resource position corresponding to "_".

In FIG. 4*b* and FIG. 4*c*, two TDD periods are used as an example. It may be understood that one transmission resource configuration period may alternatively include more or fewer TDD periods.

As shown in FIG. 5*a*, the MT of the IAB node (MT for short) supports a resource configuration method starting with an uplink time domain resource. The MT performs uplink transmission on a downlink transmission resource of the DU of the IAB node. That is, when the DU of the IAB node sends downlink data to a lower-level node, the MT sends uplink data to the upper-level node. In this way, the IAB node complies with a half-duplex constraint, and implements spatial multiplexing of an access link and a backhaul link. Further, as shown in FIG. 5*b*, the DU supports a resource configuration method starting with an uplink time domain resource. The DU performs uplink transmission on a downlink transmission resource of the MT of the IAB node. That is, when the MT of the IAB node receives downlink data from the upper-level node, the DU receives uplink data from a lower-level node. In this way, the IAB node complies with a half-duplex constraint, and implements spatial multiplexing of an access link and a backhaul link.

Corresponding to the first configuration and the second configuration, a DU of the upper-level node has two working patterns: a first pattern and a second pattern. The first pattern is a DU working pattern that matches the first configuration, where the DU can communicate with both UE and the IAB-MT. The second pattern is a DU working pattern that matches the second configuration, where the DU can communicate with only the IAB-MT in a current standard protocol framework (3GPP Rel-16). To provide services for both the IAB-MT and the UE, the DU of the upper-level node may switch a working pattern at any time. For example, when communicating with the UE, the DU of the upper-level node uses the first pattern; when communicating with the IAB-MT and the UE, the DU of the upper-level node uses the first pattern; or when communicating with the IAB-MT, the DU of the upper-level node uses the second pattern.

FIG. 6 is a schematic diagram of two working patterns of a DU of an upper-level node. One configuration period (or one TDD period) includes five slots. FIG. 6 shows four TDD periods. The first TDD period to the fourth TDD period include 20 slots in total, and slot symbols are represented by 0, 1, 2, . . . , and 19. The first pattern matches the first configuration, and starts with D and ends with U. The second pattern matches the second configuration, and starts with U and ends with D. Transmission directions of the first pattern on transmission resources in one configuration period may be represented as DDDFU. Transmission directions of the second pattern on transmission resources in one configuration period may be represented as _UU_D, where "_" indicates null and means a hard resource of the DU of the IAB node. In this example, it is assumed that the IAB node does not have a multiplexing capability of simultaneously performing sending and receiving on the MT and the DU. Therefore, the MT of the IAB node does not expect to be scheduled for transmission at a resource position corresponding to "_". The DU of the upper-level node uses the first pattern in a slot 0 to a slot 4, uses the second pattern in a slot 5 to a slot 9, uses the second pattern in a slot 10 to a slot 14, and uses the first pattern in a slot 15 to a slot 19.

How the MT of the first node performs communication after obtaining the first configuration and the second configuration is a problem that needs to be further considered. Based on the foregoing descriptions, the following describes a process of a second communication method in an embodiment of this application. In the second communication method, a communication method is designed for a node, and an IAB node is used as an example of the node. In addition, an MT of the IAB node (IAB-MT) is used as an example for example description. It may be understood that descriptions in this embodiment may be correspondingly applied to a DU of the IAB node, due to consistent technical ideas.

Referring to FIG. 7, the process of the second communication method is described as follows: The method is performed by an MT of a first node. The first node may be a base station, a relay node, an IAB node, a terminal having a relay function, or any device having a relay function.

S701: The MT of the first node obtains transmission resource configurations.

This operation is the same as S401. For details, refer to the description of S401. Details are not described herein again.

S702: The MT of the first node determines, according to a specified rule, one or more of the following:

whether to perform uplink sending on a first time domain resource in the transmission resource configurations, whether to perform downlink receiving on a second time domain resource in the transmission resource configurations, whether to send an uplink signal on a third time domain resource in a reference configuration, or whether to receive a downlink signal on a fourth time domain resource in the reference configuration, where the first time domain resource is an uplink time domain resource, the second time domain resource is a downlink time domain resource, and the reference configuration is at least one of a first configuration and a second configuration.

The MT of the first node communicates with a second node according to the specified rule. The communication includes any one or more of receiving a downlink signal, sending an uplink signal, performing uplink sending, or performing downlink receiving.

According to the embodiment in FIG. 7, when the transmission resource configurations include the first configuration and the second configuration, the MT of the first node may determine that the MT of the first node should receive or send a signal. Opposite transmission directions may be configured in the first configuration and the second configuration, and resource positions of some specific signals/channels are valid in only a transmission direction. Therefore, when there are two transmission resource configurations and different transmission directions are separately configured in the two transmission resource configurations, the MT of the first node determines, depending on the specified rule, whether a transmission resource of a signal/channel on a time domain resource is valid. The following describes a possible implementation of S702 in detail.

The time domain resource may be one or more slots or one or more symbols in one configuration period. The symbol may be an orthogonal frequency division multiplexing (OFDM) symbol. The first time domain resource, the second time domain resource, the third time domain resource, and the fourth time domain resource all comply with the concept description of the time domain resource.

The MT of the first node may be an MT for short. Some signals or channels may be transmitted between the MT and an upper-level node. For example, the MT may send an uplink signal to the upper-level node, or may receive a downlink signal from the upper-level node.

The uplink signal may be some uplink signals or channels, for example, a physical random access channel (PRACH), or the uplink signal may be any one of aperiodic channel state information (CSI), periodic channel state information (CSI), semi-persistent CSI, or a sounding reference signal (SRS). The SRS includes a periodic SRS or a semi-persistent SRS. Alternatively, the uplink signal may be a physical uplink control channel (PUCCH). The PUCCH may be a periodic PUCCH or a semi-persistent PUCCH. Alternatively, the uplink signal may be a physical uplink shared channel (PUSCH).

The downlink signal may be some downlink signals. For example, the downlink signal is a reference signal. The reference signal may be a synchronization signal/physical broadcast channel block (synchronization signal/PBCH block, SS/PBCH block), a channel state information-reference signal (CSI-RS), a tracking reference signal (TRS), or a phase tracking-reference signal (PT-RS). In NR, a primary synchronization signal (PSS), a secondary synchronization signal (SSS), and a physical broadcast channel (PBCH) are referred to as a synchronization signal/physical broadcast channel block (synchronization signal/PBCH block, SS/PBCH block). In this application, for ease of description, the SS/PBCH block may be referred to as an SSB. The CSI-RS may be a periodic CSI-RS, or may be an aperiodic CSI-RS. Alternatively, the downlink signal may be a physical downlink control channel (PDCCH), for example, a physical downlink control channel search space, or a control resource set (CORESET) such as a type 0 CORESET-PDCCH.

The MT determines, according to the specified rule, whether the MT is to receive or send a signal, whether to perform uplink sending on the first configuration or the second configuration, or whether to perform downlink receiving on the first configuration or the second configuration. Details are described below.

(1) Reference Configuration

First, a concept or meaning of the reference configuration is described. In a conventional solution, for example, for UE, there is only one configuration: the first configuration. It is specified that a resource position of an uplink signal is configured with reference to an uplink time domain resource in the first configuration, and it is specified that a resource position of a downlink signal is configured with reference to a downlink time domain resource in the first configuration. In other words, the resource position of the uplink signal is an uplink time domain resource in the first configuration, and the resource position of the downlink signal is a downlink time domain resource in the first configuration. If the resource position of the uplink signal is a downlink time domain resource in the first configuration, the UE does not send the uplink signal on the downlink time domain resource. If the resource position of the downlink signal is an uplink time domain resource in the first configuration, the UE does not receive the downlink signal on the uplink time domain resource.

In this embodiment of this application, the transmission resource configurations obtained by the MT include two configurations: the first configuration and the second configuration. On a basis of obtaining the first configuration and the second configuration, the MT needs to determine one or more configurations that are the reference configuration. The MT determines, based on the reference configuration, whether to perform receiving or sending. The specified rule includes or indicates the one or more configurations that are the reference configuration. For different uplink signals or different downlink signals, the MT separately determines reference configurations according to the specified rule.

For example, the downlink signal is an SSB, and the specified rule includes or indicates that the reference configuration is the first configuration.

For another example, the uplink signal is a PRACH, and the specified rule includes or indicates that the reference configuration is the first configuration.

For another example, the uplink signal is an SRS, and the specified rule includes or indicates that the reference configuration has the following several possibilities: the reference configuration is the first configuration, the reference configuration is the second configuration, the reference configuration is the first configuration and the second configuration, or the reference configuration is indicated by the upper-level node. If the reference configuration is the first configuration and the second configuration, when both the first configuration and the second configuration are uplink time domain resources at a position of the uplink signal (for example, an SRS), the uplink signal is sent. This means that the uplink signal is not sent in another case.

For another example, when the downlink signal is any one of a CSI-RS, a TRS, a PDCCH search space, or a control resource set, the specified rule includes or indicates that the reference configuration has the following several possibilities: the reference configuration is the first configuration, the reference configuration is the second configuration, the reference configuration is the first configuration and the second configuration, or the reference configuration is indicated by the upper-level node. If the reference configuration is the first configuration and the second configuration, when both the first configuration and the second configuration are downlink time domain resources at a position of the downlink signal, the downlink signal is received. This means that the downlink signal is not received in another case.

(2) The MT determines, according to a specified rule, whether to send an uplink signal on a third time domain resource in a reference configuration.

The third time domain resource is any time domain resource in the reference configuration. The MT determines, according to the specified rule, whether to send the uplink signal on any time domain resource.

The MT may determine, based on the reference configuration and a resource position of the uplink signal, whether to send the uplink signal on the third time domain resource in the reference configuration.

The specified rule includes one or more of the following: when the third time domain resource in the reference configuration is an uplink time domain resource at the resource position of the uplink signal, the uplink signal is allowed to be sent on the third time domain resource; when the third time domain resource in the reference configuration is a downlink time domain resource at the resource position of the uplink signal, the uplink signal is not sent on the third time domain resource; when the third time domain resource in the reference configuration is in a flexible direction at the resource position of the uplink signal, the uplink signal is sent on the third time domain resource; or when the third time domain resource in the reference configuration is in a flexible direction at the resource position of the uplink signal, and the MT receives an SFI that further indicates that a flexible symbol resource is in an uplink direction, the uplink signal is sent on the third time domain resource.

When the uplink signal is allowed to be sent on the third time domain resource, the MT may send the uplink signal on the third time domain resource, or may determine, based on an implementation of the MT, not to send the uplink signal.

(3) The MT determines, according to a specified rule, whether to receive a downlink signal on a fourth time domain resource in the reference configuration.

The fourth time domain resource is any time domain resource in the reference configuration. The MT determines, according to the specified rule, whether to receive the downlink signal on any time domain resource.

The MT may determine, based on the reference configuration and a resource position of the downlink signal, whether to receive the downlink signal on the fourth time domain resource in the reference configuration.

The specified rule includes one or more of the following: when the fourth time domain resource in the reference configuration is a downlink time domain resource at the resource position of the downlink signal, the downlink signal is allowed to be received on the fourth time domain resource; when the fourth time domain resource in the reference configuration is an uplink time domain resource at the resource position of the downlink signal, the downlink signal is not received on the fourth time domain resource; when the fourth time domain resource in the reference configuration is in a flexible direction at the resource position of the downlink signal, the downlink signal is received on the fourth time domain resource; or when the fourth time domain resource in the reference configuration is in a flexible direction at the resource position of the downlink signal, and the MT receives an SFI indicator that further indicates that a flexible symbol resource is in a downlink direction, the downlink signal is received on the fourth time domain resource.

When the downlink signal is allowed to be received on the fourth time domain resource, the MT may receive the downlink signal on the fourth time domain resource, or may determine, based on an implementation of the MT, not to receive the downlink signal.

(4) The MT determines, according to a specified rule, whether to perform uplink sending on a first time domain resource in the transmission resource configurations, where the first time domain resource is an uplink time domain resource, and the first time domain resource is in an uplink direction.

The first time domain resource is any time domain resource in the transmission resource configurations. The MT may reserve one or both of the first configuration and the second configuration in one configuration period. This is not limited in this embodiment of this application. The first time domain resource may be any time domain resource in the first configuration, or may be any time domain resource in the second configuration.

The MT determines, according to the specified rule, whether to perform uplink sending on any uplink time domain resource.

In this embodiment of this application, the uplink sending may be sending any uplink signal, may be sending uplink data, for example, a PUSCH, or may be sending uplink control information, for example, a PUCCH.

Usually, after obtaining the transmission resource configurations, the MT may perform uplink sending on an uplink time domain resource in the transmission resource configurations. However, considering that resource positions of some downlink signals may overlap the uplink time domain resource in the transmission resource configurations, if uplink sending is performed at a resource position of a downlink signal, the downlink signal cannot be received, affecting communication performance.

Based on this, the specified rule may further include one or more of the following:

- when the first time domain resource is located at the resource position of the downlink signal, uplink sending is not performed on the first time domain resource; and/or
- when the first time domain resource is not located at the resource position of the downlink signal, uplink sending is allowed to be performed on the first time domain resource.

When uplink sending is allowed to be performed on the first time domain resource, the MT may perform uplink sending on the first time domain resource, or may determine, based on an implementation of the MT, not to perform uplink sending.

(5) The MT determines, according to a specified rule, whether to perform downlink receiving on a second time domain resource in the transmission resource configurations.

The second time domain resource is a downlink time domain resource, or the second time domain resource is in a downlink direction.

The second time domain resource is any time domain resource in the transmission resource configurations. The MT may reserve one or both of the first configuration and the second configuration in one configuration period. This is not limited in this embodiment of this application. The second time domain resource may be any time domain resource in the first configuration, or may be any time domain resource in the second configuration.

The MT determines, according to the specified rule, whether to perform downlink receiving on any downlink time domain resource.

In this embodiment of this application, the downlink receiving may be receiving any downlink signal, may be receiving downlink data, for example, receiving a physical downlink shared channel (PDSCH), or may be receiving downlink control signaling, for example, receiving a PDCCH.

Usually, after obtaining the transmission resource configurations, the MT may perform downlink receiving on a downlink time domain resource in the transmission resource configurations. However, considering that resource positions of some uplink signals may overlap the downlink time domain resource in the transmission resource configurations, if downlink receiving is performed at a resource position of an uplink signal, uplink data may not be sent, affecting communication performance.

Based on this, the specified rule may further include one or more of the following:

- when the second time domain resource is located at the resource position of the uplink signal, downlink receiving is not performed on the second time domain resource; and/or
- when the second time domain resource is not located at the resource position of the uplink signal, downlink receiving is performed on the second time domain resource.

When downlink receiving is allowed to be performed on the second time domain resource, the MT may perform downlink receiving on the second time domain resource, or may determine, based on an implementation of the MT, not to perform downlink receiving.

With reference to application scenarios, the following describes the specified rule and operations of the MT by using examples.

I. The downlink signal is an SSB (or SS/PBCH).

Because a DU of the upper-level node needs to send a cell-level synchronization signal, the DU of the upper-level node sends the SSB in the first pattern. The first configuration may be compatible with an SSB configuration, that is, a resource position of the SSB should be a downlink time domain resource in the first configuration. The second configuration may be incompatible with the SSB configuration, that is, an uplink time domain resource in the second configuration may be located at the resource position of the SSB.

Figure 8:
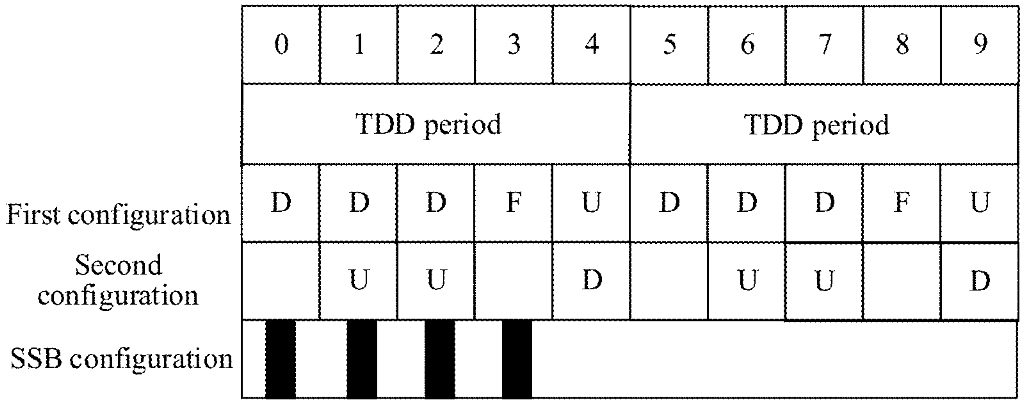
FIG. 8 is a schematic diagram of transmission resource configurations and an SSB configuration according to an embodiment of this application.

As shown in FIG. 8, two TDD periods (configuration periods) are used as an example. One TDD period includes five time domain resources. Sequence numbers of time domain resources in the first TDD period are 0 to 4, and sequence numbers of time domain resources in the second TDD period are 5 to 9. The MT obtains the first configuration and the second configuration, and may further obtain the SSB configuration. The MT may receive an SSB-based block measurement timing configuration (SSB-based block measurement timing configuration, SMTC) from the upper-level node, where the SMTC indicates the SSB configuration, namely, a time domain resource position at which the IAB MT measures an SSB of a neighboring cell.

Transmission directions of the first configuration on transmission resources in one configuration period may be represented as DDDFU, that is, transmission directions of the first configuration on the time domain resources 0 to 4 are respectively DDDFU, and transmission directions of the first configuration on the time domain resources 5 to 9 are respectively DDDFU. Transmission directions of the second configuration on transmission resources in one configuration period may be represented as _UU_D, where "_" indicates null in FIG. 8 and means a hard resource of the DU of the IAB node. In this example, it is assumed that the IAB node does not have a multiplexing capability of simultaneously performing sending and receiving on the MT and the DU. Therefore, the MT of the IAB node does not expect to be scheduled for transmission at a resource position corresponding to "_". That is, in the first configuration period, the MT can use only time domain resources 1, 2, and 4, the time domain resources 1 and 2 are in a U transmission direction, and the time domain resource 4 is in a D transmission direction. A resource position in the SSB configuration is shown in FIG. 8. The specified rule may include one or more of the following:

(1) The reference configuration is the first configuration.

The MT determines, based on the first configuration and a resource position of the SSB, whether to receive the SSB on a time domain resource in the first configuration.

When the time domain resource in the first configuration is a downlink time domain resource at the resource position of the SSB, the SSB is allowed to be received; or when the time domain resource in the first configuration is an uplink time domain resource at the resource position of the SSB, the SSB is not received.

As shown in FIG. 8, in the first TDD period, resource positions of the SSB are time domain resources 0, 1, 2, and 3 in the first configuration, and all the resource positions of the SSB are downlink time domain resources in the first configuration. In the first TDD period, the SSB is allowed to be received on the time domain resources 0, 1, 2, and 3 in the first configuration. In actual application, a resource position in the SSB configuration may be an uplink time domain resource in the first configuration. For example, in the first TDD period, a resource position of the SSB is the time domain resource 4. In this case, the MT does not receive the SSB on the time domain resource 4.

(2) Uplink sending is not performed at a resource position of the SSB.

The MT may use any one or more of the first configuration and the second configuration. When any time domain resource is located at a resource position of the SSB, uplink sending is not performed on the time domain resource.

In actual application, the MT may preferentially select the second configuration. It is assumed that the MT uses the second configuration in the first TDD period. Time domain resources 1 and 2 in the second configuration are uplink time domain resources and are time domain resources used for uplink sending, but the time domain resources 1 and 2 in the second configuration are located at resource positions of the SSB. In this case, the MT does not perform uplink sending on the time domain resources 1 and 2 in the second configuration.

Because an SSB signal usually needs to be periodically scanned and sent in an entire cell, UE can or needs to receive the SSB. To reduce resource overheads of the upper-level node, the IAB MT should also be able to measure or receive a potential SSB signal.

Therefore, the IAB MT does not perform uplink sending at the resource position of the SSB, and can receive the potential SSB signal.

(3) Uplink sending can be performed on an uplink time domain resource that does not overlap a resource position of the SSB.

FIG. 8 shows that both uplink time domain resources 1 and 2 in the second configuration overlap resource positions of the SSB. Assuming that the uplink time domain resource 2 in the second configuration does not overlap a resource position of the SSB, the MT can perform uplink sending on the uplink time domain resource 2 in the second configuration.

(4) The second configuration cannot override the first configuration at a resource position of the SSB.

The first configuration is used as a basic configuration, and based on the first configuration, the second configuration is used to override the first configuration based on a transmission resource period. An uplink time domain resource, a downlink time domain resource, and a flexible time domain resource in the first configuration are all allowed to be overridden. Because a reference configuration of an SSB resource is the first configuration, due to a design that the second configuration cannot override the first configuration at the resource position of the SSB, it can be ensured that the MT uses the original first configuration at the resource position of the SSB, so that the resource position of the SSB is compatible, and the SSB can be correctly received.

(5) The second configuration is invalid at a resource position of the SSB.

Regardless of whether the MT separately uses the first configuration, separately uses the second configuration, or reserves both the first configuration and the second configuration at the resource position of the SSB, the second configuration is set to be invalid at the resource position of the SSB, so that it can help successfully receive the SSB. The resource position of the SSB is configured with reference to the first configuration, and it is very likely that transmission directions of the second configuration and the first configuration on a same time domain resource are opposite. In this case, it is very likely that the second configuration is in an uplink transmission direction at the resource position of the SSB. The second configuration is set to be invalid at the resource position of the SSB, so that it can help ensure that the MT does not perform uplink sending at the resource position of the SSB based on the second configuration, to successfully receive the SSB.

(6) A reference configuration of an IAB-dedicated SSB signal is the second configuration.

Because the second configuration is an IAB-node-dedicated resource configuration, and UE cannot receive the second configuration, the second configuration can be used as a reference configuration for receiving the IAB-dedicated SSB signal. The first configuration may be compatible with a common SSB signal. The common SSB signal is an SSB signal that is broadcast and sent by the upper-level node on a sync-raster specified in a 3GPP protocol and that can be received from an air interface by both an initial-state (idle) UE and the IAB node without additional configuration information. The second configuration may be compatible with the IAB-dedicated SSB signal but incompatible with the common SSB signal. In this case, the IAB node can still perform synchronization and measurement by using the IAB-dedicated SSB signal.

The MT determines, based on the second configuration and an IAB-dedicated SSB signal configuration, whether to receive the SSB on a time domain resource in the second configuration.

When the time domain resource in the second configuration is a downlink time domain resource at a resource position of the SSB, the IAB MT can receive the SSB; or when the time domain resource in the second configuration is an uplink time domain resource at the resource position of the SSB, the IAB MT does not perform uplink sending.

II. The uplink signal is a PRACH.

Figure 9:
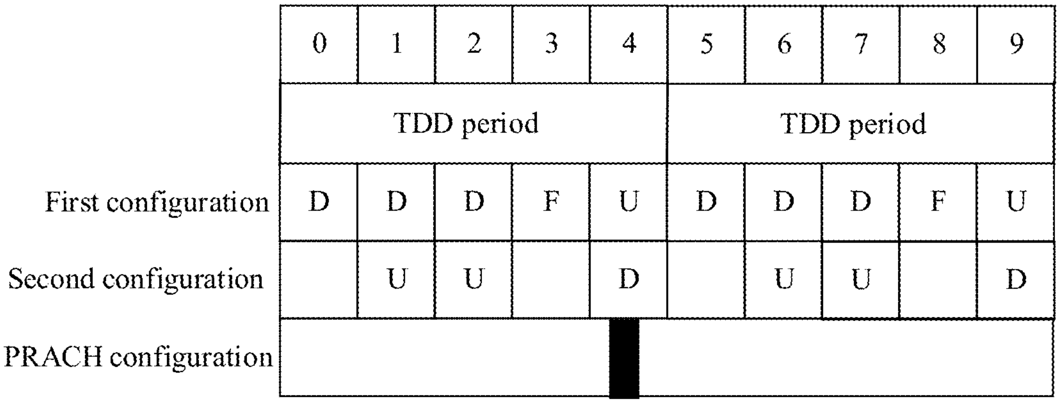
FIG. 9 is a schematic diagram of transmission resource configurations and a PRACH configuration according to an embodiment of this application.

As shown in FIG. 9, two TDD periods (configuration periods) are used as an example. One TDD period includes five time domain resources. Sequence numbers of time domain resources in the first TDD period are 0 to 4, and sequence numbers of time domain resources in the second TDD period are 5 to 9. The MT obtains the first configuration and the second configuration, and may further obtain a PRACH configuration. The MT may obtain the PRACH configuration by using any one of a system broadcast message, an RRC configuration, or DCI signaling of a PDCCH, where the PRACH configuration includes or indicates a resource position of the PRACH.

The first configuration and the second configuration are still described by using the example shown in FIG. 8. For descriptions of the first configuration and the second configuration, refer to the embodiment in FIG. 8. Details are not described herein again.

A resource position in the PRACH configuration is shown in FIG. 9. In the first TDD period, a resource position of the PRACH is a time domain resource 4.

The specified rule may include one or more of the following:

(1) The reference configuration is the first configuration.

Because the second configuration is an IAB-node-dedicated resource configuration, and UE cannot receive the second configuration, the first configuration can be used as a reference configuration for sending the PRACH. The first configuration may be compatible with the PRACH configuration, that is, a resource position of the PRACH should be an uplink time domain resource in the first configuration. The second configuration may be incompatible with the PRACH configuration, that is, a downlink time domain resource in the second configuration may also be located at the resource position of the PRACH.

The MT determines, based on the first configuration and a resource position of the PRACH, whether to send the PRACH on a time domain resource in the first configuration.

When the time domain resource in the first configuration is an uplink time domain resource at the resource position of the PRACH, the PRACH is allowed to be sent; or when the time domain resource in the first configuration is a downlink time domain resource at the resource position of the PRACH, the PRACH is not sent.

As shown in FIG. 9, in the first TDD period, the resource position of the PRACH is the time domain resource 4 in the first configuration, and the time domain resource 4 in the first configuration is an uplink time domain resource. In the first TDD period, the PRACH is allowed to be sent on the time domain resource 4 in the first configuration. In actual application, a resource position of the PRACH may be a downlink time domain resource in the first configuration. For example, in the first TDD period, a resource position of the PRACH is a time domain resource 0, 1, 2, or 3. In this case, the MT does not send the PRACH on the time domain resource 0, 1, 2, or 3.

(2) Downlink receiving is not performed at a resource position of the PRACH.

The MT may use any one or more of the first configuration and the second configuration. When any time domain resource is located at a resource position of the PRACH, downlink receiving is not performed on the time domain resource.

In actual application, the MT may preferentially select the second configuration. It is assumed that the MT uses the second configuration in the first TDD period. A time domain resource 4 in the second configuration is a downlink time domain resource and is a time domain resource used for downlink receiving, but the time domain resource 4 in the second configuration is located at a resource position of the PRACH. In this case, the MT does not perform downlink receiving on the time domain resource 4 in the second configuration.

Because PRACH resources are periodic and shared by UE, that is, the UE also needs to use these PRACH resources to initiate random access to a base station, to reduce resource overheads of the upper-level node, the IAB MT should also be able to use these PRACH resources to initiate random access.

Therefore, the IAB MT does not perform downlink receiving at the resource position of the PRACH, and can use a PRACH resource to initiate random access.

(3) Downlink receiving can be performed on a downlink time domain resource that does not overlap a resource position of the PRACH.

FIG. 9 shows that a downlink time domain resource 4 in the second configuration overlaps a resource position of the PRACH. Assuming that a time domain resource 3 in the second configuration is also a downlink time domain resource, and the downlink time domain resource 3 does not overlap a resource position of the PRACH, the MT can perform downlink receiving on the downlink time domain resource 3 in the second configuration.

(4) The second configuration cannot override the first configuration at a resource position of the PRACH.

The first configuration is used as a basic configuration, and based on the first configuration, the second configuration is used to override the first configuration based on a transmission resource period. An uplink time domain resource, a downlink time domain resource, and a flexible time domain resource in the first configuration are all allowed to be overridden. Because a reference configuration of a PRACH resource is the first configuration, due to a design that the second configuration cannot override the first configuration at the resource position of the PRACH, it can be ensured that the MT uses the original first configuration at the resource position of the PRACH, so that the resource position of the PRACH is compatible, that is, it is ensured that the PRACH is sent on a time domain resource that is an uplink time domain resource in the first configuration.

(5) The second configuration is invalid at a resource position of the PRACH.

Regardless of whether the MT separately uses the first configuration, separately uses the second configuration, or reserves both the first configuration and the second configuration at the resource position of the PRACH, the second configuration is set to be invalid at the resource position of the PRACH, so that it can help successfully send the PRACH. The resource position of the PRACH is configured with reference to the first configuration, and it is very likely that transmission directions of the second configuration and the first configuration on a same time domain resource are opposite. In this case, it is very likely that the second configuration is in a downlink transmission direction at the resource position of the PRACH. The second configuration is set to be invalid at the resource position of the PRACH, so that it can help ensure that the MT does not perform downlink receiving at the resource position of the PRACH based on the second configuration, to avoid a data loss.

(6) A valid random access occasion (RO) is determined based on the first configuration.

In other words, the MT does not expect to determine the valid RO by using the second configuration.

The valid RO means the following: If a resource position of the PRACH is an uplink time domain resource in a configuration period, a position of the uplink time domain resource is a valid RO. If a resource position of the PRACH is a downlink time domain resource in the configuration period or is not an uplink time domain resource in the configuration period, it is considered that the position is not a valid RO.

The valid RO is determined based on the first configuration. That is, if a resource position of the PRACH is an uplink time domain resource in the first configuration, a position of the uplink time domain resource in the first configuration is a valid RO.

(7) A reference configuration of an IAB-dedicated PRACH signal is the second configuration.

Because the second configuration is an IAB-node-dedicated resource configuration, and UE cannot receive the second configuration, the second configuration can be used as a reference configuration for sending the IAB-dedicated PRACH. The first configuration may be compatible with a cell-level PRACH configuration. The cell-level PRACH configuration is a configuration that is broadcast by the upper-level node by using a system message and that can be received by both the UE and the IAB node from an air interface. The second configuration may be compatible with the IAB-dedicated PRACH configuration but incompatible with the cell-level PRACH configuration. In this case, the IAB node can still send a random access request by using the IAB-dedicated PRACH configuration.

The MT determines, based on the second configuration and a resource position of the PRACH, whether to send the PRACH (IAB-dedicated PRACH) on a time domain resource in the second configuration.

When the time domain resource in the second configuration is an uplink time domain resource at the resource position of the PRACH, the PRACH is allowed to be sent; or when the time domain resource in the second configuration is a downlink time domain resource at the resource position of the PRACH, the PRACH is not sent. III. The downlink signal is a CSI-RS.

Different from a cell-level configuration signal such as a synchronization signal (SSB), the CSI-RS is a user-level configuration signal or an MT-level configuration signal. However, in actual application, a base station may configure a same CSI-RS for a plurality of UEs (or a plurality of MTs). Therefore, the DU of the upper-level node usually also sends the CSI-RS in the first pattern.

The DU of the upper-level node may alternatively configure a dedicated CSI-RS resource for the MT of the first node. In this case, the DU of the upper-level node may send the CSI-RS in the second pattern.

Based on this, the reference configuration may be the first configuration, and corresponds to sending, by the upper-level node, the CSI-RS in the first pattern; or the reference configuration may be the second configuration, and corresponds to sending, by the upper-level node, the CSI-RS in the second pattern. Alternatively, the reference configuration may be the first configuration and the second configuration.

The specified rule may include one or more of the following:

1. The reference configuration is the first configuration.

The MT determines, based on the first configuration and a resource position of the CSI-RS, whether to receive the CSI-RS on a time domain resource in the first configuration.

When the first configuration is a downlink time domain resource at the resource position of the CSI-RS, the CSI-RS is allowed to be received; or when the first configuration is an uplink time domain resource at the resource position of the CSI-RS, the CSI-RS is not received.

2. The reference configuration is the second configuration.

The MT determines, based on the second configuration and a resource position of the CSI-RS, whether to receive the CSI-RS on a time domain resource in the second configuration.

When the second configuration is a downlink time domain resource at the resource position of the CSI-RS, the CSI-RS is allowed to be received; or when the second configuration is an uplink time domain resource at the resource position of the CSI-RS, the CSI-RS is not received.

3. The reference configuration is the first configuration and the second configuration.

The MT determines, based on the first configuration, the second configuration, and a resource position of the CSI-RS, whether to receive the CSI-RS.

When both the first configuration and the second configuration are downlink time domain resources at the resource position of the CSI-RS, the CSI-RS is allowed to be received; otherwise, the CSI-RS is not received.

4. The reference configuration is indicated by the upper-level node. The upper-level node may indicate that the reference configuration is the first configuration, may indicate that the reference configuration is the second configuration, or may indicate that the reference configuration is the first configuration and the second configuration.

Figure 10:
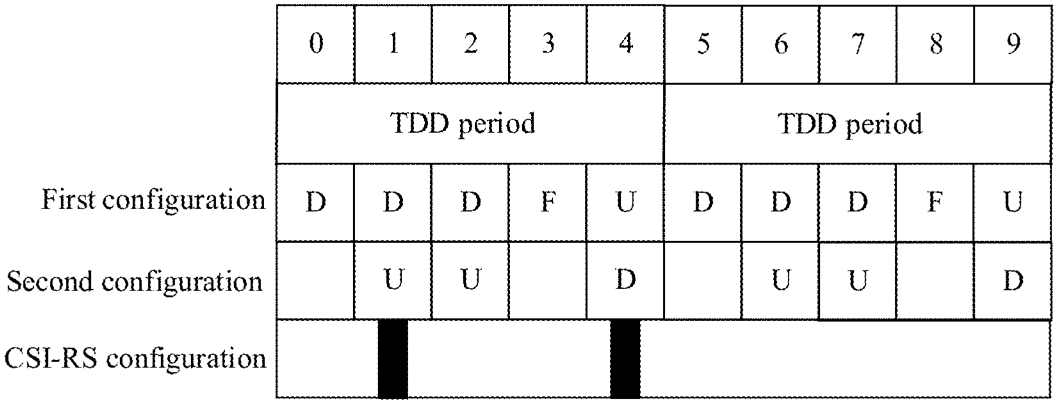
FIG. 10 is a schematic diagram of transmission resource configurations and a CSI-RS configuration according to an embodiment of this application.

As shown in FIG. 10, the first configuration and the second configuration are still described by using the example shown in FIG. 8. For descriptions of the first configuration and the second configuration, refer to the embodiment in FIG. 8. Details are not described herein again.

The MT obtains the first configuration and the second configuration, and may further obtain a CSI-RS configuration. The MT may obtain the CSI-RS configuration by using a measurement configuration, where the measurement configuration indicates a resource for measuring the CSI-RS. The CSI-RS configuration includes or indicates a resource position of the CSI-RS.

As shown in FIG. 10, in the first TDD period, resource positions of the CSI-RS are a time domain resource 1 and a time domain resource 4.

If the reference configuration is the first configuration, in the first TDD period, when the first configuration is a downlink time domain resource at a resource position of the CSI-RS, the CSI-RS is allowed to be received; or when the first configuration is an uplink time domain resource at a resource position of the CSI-RS, the CSI-RS is not received. The first configuration is a downlink time domain resource on the time domain resource 1, that is, the CSI-RS is allowed to be received on the time domain resource 1. The first configuration is an uplink time domain resource on the time domain resource 4, that is, the CSI-RS is not received on the time domain resource 4.

If the reference configuration is the second configuration, in the first TDD period, when the second configuration is a downlink time domain resource at a resource position of the CSI-RS, the CSI-RS is allowed to be received; or when the second configuration is an uplink time domain resource at a resource position of the CSI-RS, the CSI-RS is not received. The second configuration is a downlink time domain resource on the time domain resource 4, that is, the CSI-RS is allowed to be received on the time domain resource 4. The second configuration is an uplink time domain resource on the time domain resource 1, that is, the CSI-RS is not received on the time domain resource 1.

If the reference configuration is the first configuration and the second configuration, when both the first configuration and the second configuration are downlink time domain resources at a resource position of the CSI-RS, the CSI-RS is allowed to be received; otherwise, the CSI-RS is not received. The first configuration and the second configuration are not both in a downlink transmission direction on the time domain resource 1 or the time domain resource 4. Therefore, the MT does not receive the CSI-RS in the first TDD period.

5. Uplink sending is not performed at a resource position of the CSI-RS.

The MT may use any one or more of the first configuration and the second configuration. When any time domain resource is located at a resource position of the CSI-RS, uplink sending is not performed on the time domain resource.

In actual application, the MT may preferentially select the second configuration. It is assumed that the MT uses the second configuration in the first TDD period. As shown in FIG. 10, time domain resources 1 and 2 in the second configuration are uplink time domain resources and are time domain resources used for uplink sending, but the time domain resource 1 in the second configuration is located at a resource position of the CSI-RS. In this case, the MT does not perform uplink sending on the time domain resource 1 in the second configuration.

The CSI-RS is used as a downlink reference signal, so that the UE or the IAB node can determine link/channel quality by measuring the CSI-RS. To save a signal sending resource, a base station may configure a plurality of UEs and/or MTs to measure a CSI-RS sent on a time domain resource.

Because the UE cannot receive the second configuration, only the first configuration is available. Therefore, if the base station configures a periodic CSI-RS for receiving and measurement by the UE and the IAB node, and the IAB node performs uplink sending with reference to the second configuration, the IAB node cannot measure the CSI-RS. Therefore, it should be specified that the IAB node does not perform uplink sending at the resource position of the CSI-RS.

6. Uplink sending can be performed on an uplink time domain resource that does not overlap a resource position of the CSI-RS.

The MT may use any one or more of the first configuration and the second configuration. In actual application, the MT may preferentially select the second configuration. It is assumed that the MT uses the second configuration in the first TDD period. As shown in FIG. 10, time domain resources 1 and 2 in the second configuration are uplink time domain resources and are time domain resources used for uplink sending, and the time domain resource 2 in the second configuration is not located at a resource position of the CSI-RS. The MT performs uplink sending on the time domain resource 2 in the second configuration.

7. The second configuration cannot override the first configuration at a resource position of the CSI-RS.

8. The second configuration is invalid at a resource position of the CSI-RS.

In FIG. 8 to FIG. 10, the resource positions of the SSB, the PRACH, and the CSI-RS are reflected only in one TDD period. It may be understood that an implementation in each TDD period is the same as that in the TDD period.

IV. The downlink signal is a TRS, a PT-RS, a physical downlink control channel search space, or a control resource set. A specified rule is similar to that of the CSI-RS. Reference can be made to the description of the third point, and replace the CSI-RS in the third point with the TRS, the PT-RS, the physical downlink control channel search space, or the control resource set. Technical principles are the same or similar, and details are not described herein.

V. The uplink signal is an SRS.

A design principle of a reference configuration is similar to that of the CSI-RS in the third point, and mutual reference can be made.

The SRS is a user-level configuration signal or an MT-level configuration signal. However, in actual application, a base station may configure a same SRS resource for a plurality of UEs (or a plurality of MTs). Therefore, the DU of the upper-level node usually also receives the SRS in the first pattern.

The DU of the upper-level node may alternatively configure a dedicated SRS resource for the MT of the first node. In this case, the DU of the upper-level node may receive the SRS in the second pattern.

Based on this, the reference configuration may be the first configuration, and corresponds to receiving, by the upper-level node, the SRS in the first pattern; or the reference configuration may be the second configuration, and corresponds to receiving, by the upper-level node, the SRS in the second pattern. Alternatively, the reference configuration may be the first configuration and the second configuration.

The specified rule may include one or more of the following:

1. The reference configuration is the first configuration.

The MT determines, based on the first configuration and a resource position of the SRS, whether to send the SRS on a time domain resource in the first configuration.

When the time domain resource in the first configuration is an uplink time domain resource at the resource position of the SRS, the SRS is allowed to be sent; or when the time domain resource in the first configuration is a downlink time domain resource at the resource position of the SRS, the SRS is not sent.

2. The reference configuration is the second configuration.

The MT determines, based on the second configuration and a resource position of the SRS, whether to send the SRS on a time domain resource in the second configuration.

When the time domain resource in the second configuration is an uplink time domain resource at the resource position of the SRS, the SRS is allowed to be sent; or when the time domain resource in the second configuration is a downlink time domain resource at the resource position of the SRS, the SRS is not sent.

3. The reference configuration is the first configuration and the second configuration.

The MT determines, based on the first configuration, the second configuration, and a resource position of the SRS, whether to send the SRS.

When both the first configuration and the second configuration are uplink time domain resources at the resource position of the SRS, the SRS is allowed to be sent; otherwise, the SRS is not sent.

Figures 11, 12:
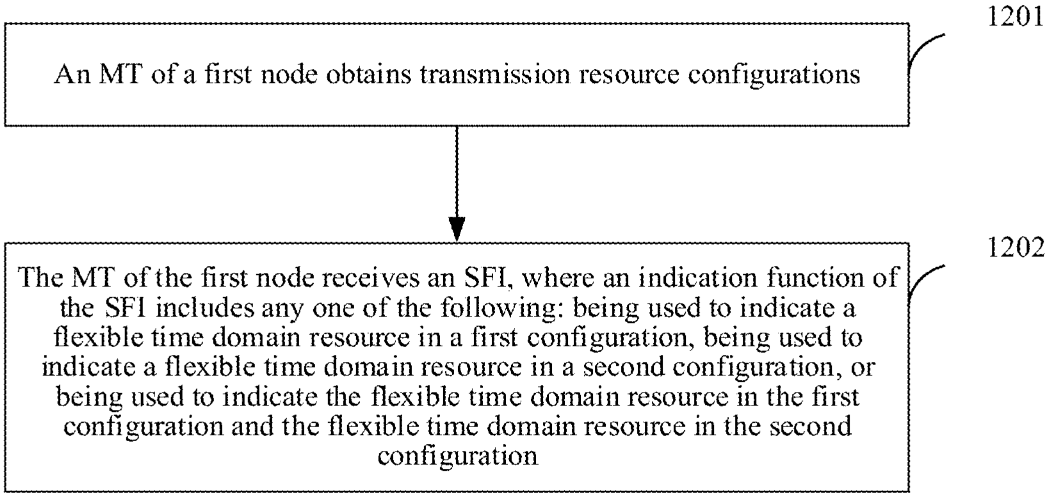
FIG. 11 is a schematic diagram of an indication function of an SFI in a scenario according to an embodiment of this application.
FIG. 12 is a schematic flowchart of a third communication method according to an embodiment of this application.

In a scenario in which the transmission resource configurations obtained by the MT include only the first configuration, as shown in FIG. 11, the MT obtains the first configuration, where the first configuration may include a time domain resource F, that is, the time domain resource is in a flexible transmission direction. Further, the upper-level node may further indicate a transmission direction of F to the MT by using DCI 2_0, to change F to D or U, or continue to maintain F. DCI 2_0 may include a slot format indicator (SFI), and the SFI is used to indicate the transmission direction of F. As shown in FIG. 11, in one TDD period, the fourth time domain resource is F. If indication information is used to indicate that F is uplink (U), the MT cancels downlink receiving on the F time domain resource; or if indication information is used to indicate that F is downlink (D), the MT cancels uplink sending on the time domain resource. If indication information indicates that F is flexible, the MT may cancel downlink receiving or uplink sending of some higher-layer configurations, or the time domain resource F may be further scheduled as D or U. For example, as shown in FIG. 11, in the first TDD period, the SFI indicates that one part of a time domain resource 3 is changed to downlink (D), and the other part is still F. In the second TDD period, the SFI indicates that one part of a time domain resource 8 is still F, and the other part is changed to uplink (U). If one time domain resource is one slot, the part or the other part may be one or more symbols. It may be understood that transmission directions in the TDD period shown in FIG. 11 and the transmission direction that is of F and that is indicated by the SFI are merely an example. In actual application, there may be other transmission directions.

When the transmission resource configurations obtained by the MT include a plurality of configurations, for example, the first configuration and the second configuration in the foregoing, when the upper-level node sends an SFI, the MT cannot determine a configuration that the SFI is used to indicate.

Based on this, an embodiment of this application provides a third communication method. As shown in FIG. 12, a process of the third communication method is described as follows: For explanations of a first node and a second node, refer to the descriptions in the embodiment in FIG. 4*a*, that is, the descriptions in the first communication method.

S1201: An MT of the first node obtains transmission resource configurations.

This operation is the same as S401. For details, refer to the description of S401. Details are not described herein again.

S1202: The MT of the first node receives an SFI.

The MT of the first node may receive the SFI from the second node. In some embodiments, the second node sends the SFI to the MT of the first node, and the MT of the first node receives the SFI from the second node.

An indication function of the SFI includes any one of the following: being used to indicate a flexible time domain resource in the first configuration, being used to indicate a flexible time domain resource in the second configuration, or being used to indicate the flexible time domain resource in the first configuration and the flexible time domain resource in the second configuration.

The flexible time domain resource indicates that the time domain resource is in a flexible transmission direction. Transmission resources of an MT of an IAB node may be classified into three types: downlink (D), uplink (U), and flexible (F). The flexible time domain resource is F.

By using the indication function of the SFI, the MT of the first node may determine a configuration that the SFI is used to indicate.

The following describes some optional implementations of the embodiment in FIG. 12.

The MT of the first node may receive the SFI by using the following method.

The MT of the first node receives radio resource control (RRC) signaling from a donor node, where the RRC signaling includes the indication function of the SFI.

Alternatively, the MT of the first node receives medium access control (MAC) signaling from an upper-level node, where the MAC signaling includes the indication function of the SFI.

In a possible implementation, the SFI includes indication information or an indication field, and the indication information or the indication field is used to indicate the indication function of the SFI.

The indication field may be an SFI index. For example, 255 is taken as an SFI index value in a current 3GPP protocol TS 38.213 V16.1.0, and the SFI index value is defined as being used by UE to determine whether the SFI indicator is applied to a flexible slot in TDD-UL-DL-ConfigurationCommon or TDD-UL-DL-Configuration-Dedicated. In some embodiments, the UE determines a slot format of a slot based on TDD-UL-DL-ConfigurationDedicated and detected DCI (if there is a DCI indication). An SFI index may be added, and is defined as being used by the MT to determine whether the SFI indicator is applied to a first configuration or a second configuration, or being used by the MT to determine whether the SFI indicator is applied to TDD-UL-DL-ConfigurationDedicated-IAB-MT. In some embodiments, the IAB-MT determines a slot format of a slot based on TDD-UL-DL-ConfigurationDedicated-IAB-MT and detected DCI (if there is a DCI indication).

For example, Table 1 shows a description of a definition of the SFI index.

TABLE 1

| Format | Symbols in a slot (meaning of an SFI value) |
|---|---|
| 254 | IAB-MT determines the slot format for the slot based on TDD-UL-DL-ConfigurationDedicated-IAB-MT and, if any, on detected DCI formats. IAB-MT determines the slot format for the slot based on TDD-UL-DL-ConfigurationDedicated-IAB-MT and, if any, on detected DCI formats |
| 255 | UE determines the slot format for the slot based on TDD-UL-DL-ConfigurationCommon, or TDD-UL-DL-ConfigurationDedicated and, if any, on detected DCI formats. UE determines the slot format for the slot based on TDD-UL-DL-ConfigurationCommon, or TDD-UL-DL-ConfigurationDedicated and, if any, on detected DCI formats |

If the SFI is used to indicate the flexible time domain resource in the first configuration, for an operation performed by the first node based on the indication of the SFI and the indication function of the SFI, refer to the descriptions of the method in FIG. 11. If the SFI is used to indicate the flexible time domain resource in the second configuration, for an operation performed by the first node based on the indication of the SFI and the indication function of the SFI, also refer to the descriptions of the method in FIG. 11, and to replace the first configuration with the second configuration.

If the SFI is used to indicate the flexible time domain resource in the first configuration and the flexible time domain resource in the second configuration, the SFI complies with any one or more of the following rules:

1> When both the first configuration and the second configuration are downlink time domain resources on a time domain resource, the SFI is not allowed to indicate that the time domain resource is an uplink time domain resource, or the MT does not expect the SFI to indicate that the time domain resource is an uplink time domain resource.

2> When both the first configuration and the second configuration are uplink time domain resources on a time domain resource, the SFI is not allowed to indicate that the time domain resource is a downlink time domain resource, or the MT does not expect the SFI to indicate that the time domain resource is a downlink time domain resource.

3> When the first configuration is an uplink time domain resource on a time domain resource and the second configuration is a downlink time domain resource on the time domain resource, the SFI is not allowed to indicate that the time domain resource is a flexible time domain resource, or the MT does not expect the SFI to indicate that the time domain resource is a flexible time domain resource.

4> When the first configuration is a downlink time domain resource on a time domain resource and the second configuration is an uplink time domain resource on the time domain resource, the SFI is not allowed to indicate that the time domain resource is a flexible time domain resource, or the MT does not expect the SFI to indicate that the time domain resource is a flexible time domain resource.

5> Other than the cases 1> to 4>, the SFI may indicate that a time domain resource is in any format or in any direction, that is, may indicate that a time domain resource is an uplink (U) time domain resource, a downlink (D) time domain resource, or a flexible (F) time domain resource.

The time domain resource in 1> to 5> may be one or more slots, or may be one or more symbols.

That the SFI is not allowed to indicate that the time domain resource is an uplink time domain resource may be understood as that the SFI cannot indicate that the time domain resource is an uplink time domain resource. That the SFI is not allowed to indicate that the time domain resource is a downlink time domain resource may be understood as that the SFI cannot indicate that the time domain resource is a downlink time domain resource.

The rule with which the SFI complies may be predefined, or may be indicated by a DU of the upper-level node to the MT. Both the MT and the DU of the upper-level node can learn of the rule, so that the MT and the DU of the upper-level node can align understandings of an indication meaning of the SFI.

In an embodiment, a proposal corresponding to the foregoing embodiment is further disclosed, and is described as follows:

In a 3GPP release Rel-16, when TDD-UL-DL-ConfigurationDedicated-IAB-MT is provided, the IAB-MT complies with UE behavior to replace TDD-UL-DL-ConfigurationDedicated with TDD-UL-DL-ConfigurationDedicated-IAB-MT. However, in a subsequent evolved protocol release, if TDD-UL-DL-ConfigurationDedicated-IAB-MT is allowed to override all previously configured symbols in one configuration period, behavior of the IAB-MT using TDD-UL-DL-ConfigurationDedicated-IAB-MT should be reviewed again.

For example, UE behavior of a TDD configuration and UE behavior of a cell-specific signal/channel are defined in TS 38.213:

For a single carrier operation on an unpaired spectrum (indicating a TDD band), for a slot symbol set indicated to the UE by ssb-PositionsInBurst in an SIB 1 or ssb-PositionsInBurst in ServingCellConfig, for receiving an SS/PBCH block, if transmission is to overlap any symbol in the symbol set, the UE does not transmit an SRS in the slot symbol set, and the UE does not transmit a PUSCH, a PUCCH, or a PRACH in this slot. When the configuration information exists, the UE does not expect that the slot symbol set is indicated as an uplink symbol set by TDD-UL-DL-ConfigurationCommon or TDD-UL-DL-ConfigurationDedicated.

Similarly, for a slot symbol set corresponding to a valid PRACH occasion and N_gap symbols in front of the valid PRACH occasion, as described in Subclause 8.1, the UE does not receive a PDCCH or a PDSCH. If receiving is to overlap any symbol in the symbol set, the UE does not receive a CSI-RS or a TRS in this slot. The UE does not expect that the slot symbol set is indicated as downlink by TDD-UL-DL-ConfigurationCommon or TDD-UL-DL-ConfigurationDedicated.

For a slot symbol set indicated to the UE by pdcch-ConfigSIB1 in an MIB of a type 0-PDCCH CSS set, the UE does not expect that the symbol set is indicated as uplink by using TDD-UL-DL-ConfigurationCommon or TDD-UL-DL-ConfigurationDedicated.

It can be learned from the foregoing that, the TDD configurations (TDD-UL-DL-ConfigurationCommon and TDD-UL-DL-ConfigurationDedicated) should be compatible with a cell-specific channel and signal.

However, if the foregoing constraint is reserved for TDD-UL-DL-ConfigurationDedicated-IAB-MT, a quantity of spatial multiplexing occasions of the IAB node is greatly reduced. In some embodiments, in a typical TDD-uplink-downlink configuration, most SS/PBCH blocks are included in downlink slots configured by using TDD-UL-DL-ConfigurationCommon. This is because a slot configuration period is usually less than a period of the SS/PBCH block, that is, these slots cannot be indicated as uplink slots by using TDD-UL-DL-ConfigurationDedicated-IAB-MT. In other words, spatial sending cannot be implemented in these slots. It is assumed that a TDD configuration period is 2.5 ms. According to a current protocol specification, it cannot indicate that all the first four slots in one TDD configuration period are in an uplink transmission direction, because the SS/PBCH block is sent every 20 ms.

To resolve this problem, an embodiment of this application further provides a communication method. A rule is specified, to allow a signal/channel to conflict with TDD-UL-DL-ConfigurationDedicated-IAB-MT. In a slot in which a conflict occurs, the IAB node should ignore a TDD-UL-DL-ConfigurationDedicated-IAB-MT configuration and can send/receive a cell-specific signal/channel. In addition, in a TDD configuration period or slot in which no conflict occurs, the IAB node can perform transmission based on a TDD configuration. For example, to increase a quantity of spatial transmission occasions of the IAB node, it should be determined that the rule includes: allowing a conflict between TDD-UL-DL-ConfigurationDedicated-IAB-MT and a cell-specific signal/channel. In a slot in which a conflict occurs, the IAB node should ignore TDD-UL-DL-ConfigurationDedicated-IAB-MT The signal/channel includes one or more of the following:

an SS/PBCH block;

a type 0 CORESET-PDCCH cluster set; and a PRACH.

The first, second, and third communication methods provided in the embodiments of this application are based on a same technical concept; and may jointly form solutions that need to be protected in the embodiments of this application, or may separately form solutions that need to be protected in the embodiments of this application.

To implement the functions in the foregoing methods provided in the embodiments of this application, the MT of the first node may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 13:
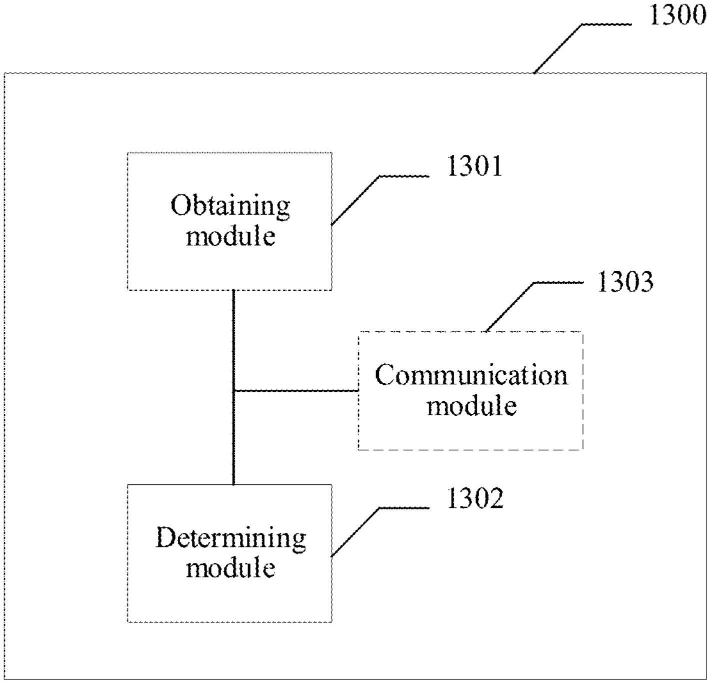
FIG. 13 is a first schematic diagram of a structure of a communication apparatus according to an embodiment of this application.

As shown in FIG. 13, based on a same technical concept, an embodiment of this application further provides a communication apparatus 1300. The communication apparatus 1300 may be the foregoing MT of the first node, or may be an apparatus in the MT of the first node or an apparatus that can be used in matching with the MT of the first node. In some embodiments, the communication apparatus 1300 may include respectively corresponding modules for performing the methods/operations/steps/actions performed by the MT of the first node in the foregoing method embodiments. The module may be implemented by using a hardware circuit, software, or a combination of a hardware circuit and software. In some embodiments, the apparatus may include an obtaining module 1301 and a determining module 1302.

The obtaining module 1301 is configured to obtain transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period.

The determining module 1302 is configured to determine, according to a specified rule, one or more of the following: whether to perform uplink sending on a first time domain resource in the transmission resource configurations, whether to perform downlink receiving on a second time domain resource in the transmission resource configurations, whether to send an uplink signal on a third time domain resource in a reference configuration, or whether to receive a downlink signal on a fourth time domain resource in the reference configuration, where the first time domain resource is an uplink time domain resource, the second time domain resource is a downlink time domain resource, and the reference configuration is at least one of the first configuration and the second configuration.

When determining, according to the specified rule, whether to send the uplink signal on the third time domain resource in the reference configuration, the determining module 1302 is configured to determine, based on the reference configuration and a resource position of the uplink signal, whether to send the uplink signal on the third time domain resource in the reference configuration.

In some embodiments, the specified rule includes: when the third time domain resource in the reference configuration is an uplink time domain resource at the resource position of the uplink signal, the uplink signal is allowed to be sent on the third time domain resource.

Alternatively, the specified rule may include: when the third time domain resource in the reference configuration is a downlink time domain resource at the resource position of the uplink signal, the uplink signal is not sent on the third time domain resource.

In some embodiments, when determining, according to the specified rule, whether to receive the downlink signal on the fourth time domain resource in the reference configuration, the determining module 1302 is configured to determine, based on the reference configuration and a resource position of the downlink signal, whether to receive the downlink signal on the fourth time domain resource in the reference configuration.

In some embodiments, the specified rule includes: when the fourth time domain resource in the reference configuration is a downlink time domain resource at the resource position of the downlink signal, the downlink signal is allowed to be received on the fourth time domain resource. Alternatively, the specified rule may include: when the fourth time domain resource in the reference configuration is an uplink time domain resource at the resource position of the downlink signal, the downlink signal is not received on the fourth time domain resource.

In some embodiments, the specified rule includes: when the first time domain resource is located at the resource position of the downlink signal, uplink sending is not performed on the first time domain resource. Alternatively, the specified rule may include: when the first time domain resource is not located at the resource position of the downlink signal, uplink sending is allowed to be performed on the first time domain resource.

In some embodiments, the specified rule includes: when the second time domain resource is located at the resource position of the uplink signal, downlink receiving is not performed on the second time domain resource. Alternatively, the specified rule may include: when the second time domain resource is not located at the resource position of the uplink signal, downlink receiving is performed on the second time domain resource.

In some embodiments, the downlink signal includes any one or more of the following: a channel state information-reference signal CSI-RS, a tracking reference signal TRS, a physical downlink control channel PDCCH search space, a control resource set, or a synchronization signal/physical broadcast channel SS/PBCH.

In some embodiments, when the downlink signal includes any one or more of a CSI-RS, a TRS, a PDCCH search space, or a control resource set, the reference configuration complies with any one of the following: the reference configuration is the first configuration, the reference configuration is the second configuration, the reference configuration is the first configuration and the second configuration, or the reference configuration is indicated by an upper-level node; or when the downlink signal is an SS/PBCH, the reference configuration is the first configuration.

In some embodiments, that the reference configuration is the first configuration and the second configuration indicates that when both the first configuration and the second configuration are downlink time domain resources at the position of the downlink signal, the downlink signal is allowed to be received.

In some embodiments, the uplink signal includes a physical random access channel PRACH or a sounding reference signal SRS.

In some embodiments, when the uplink signal is a PRACH, the reference configuration complies with any one of the following: the reference configuration is the first configuration, the reference configuration is the second configuration, the reference configuration is the first configuration and the second configuration, or the reference configuration is indicated by an upper-level node; or when the uplink signal is an SRS, the reference configuration is the first configuration.

In some embodiments, that the reference configuration is the first configuration and the second configuration indicates that when both the first configuration and the second configuration are uplink time domain resources at the position of the uplink signal, the uplink signal is allowed to be sent.

In some embodiments, the apparatus further includes: a communication module 1303, configured to receive a slot format indicator SFI, where an indication function of the SFI includes any one of the following: being used to indicate a flexible time domain resource in the first configuration, being used to indicate a flexible time domain resource in the second configuration, or being used to indicate the flexible time domain resource in the first configuration and the flexible time domain resource in the second configuration.

In some embodiments, the SFI includes an indication field, and the indication field is used to indicate the indication function of the SFI.

In some embodiments, the communication module 1303 is further configured to:

receive radio resource control RRC signaling from a donor node, where the RRC signaling includes the indication function of the SFI; or receive medium access control MAC signaling from the upper-level node, where the MAC signaling includes the indication function of the SFI.

In some embodiments, if the SFI is used to indicate the flexible time domain resource in the first configuration and the flexible time domain resource in the second configuration, the SFI complies with any one or more of the following rules:

when both the first configuration and the second configuration are downlink time domain resources on the first time domain resource, the SFI is not expected to indicate that the first time domain resource is an uplink time domain resource;

when both the first configuration and the second configuration are uplink time domain resources on the second time domain resource, the SFI is not expected to indicate that the second time domain resource is a downlink time domain resource; or when the first configuration is an uplink time domain resource on the third time domain resource and the second configuration is a downlink time domain resource on the third time domain resource, or when the first configuration is a downlink time domain resource on the third time domain resource and the second configuration is an uplink time domain resource on the third time domain resource, the SFI is not expected to indicate that the third time domain resource is a flexible time domain resource.

The determining module 1302 may be referred to as a processing module, or the determining module 1302 may be integrated into a processing module.

The obtaining module 1301 may be implemented by using the communication module 1303, or may be implemented by using the processing module.

The communication module 1303 may be referred to as a transceiver module, and includes a receiving module and a sending module. The receiving module is configured to implement the receiving operations in the foregoing method embodiments, and the sending module is configured to perform the sending operations in the foregoing method embodiments.

Module division in the embodiments of this application is an example, is merely logical function division, and may be other division during actual implementation. In addition, the functional modules in the embodiments of this application may be integrated into one processor, each of the modules may exist alone physically, or two or more modules may be integrated into one module. The integrated module may be implemented in a form of hardware, or may be implemented in a form of a software functional module.

Figure 14:
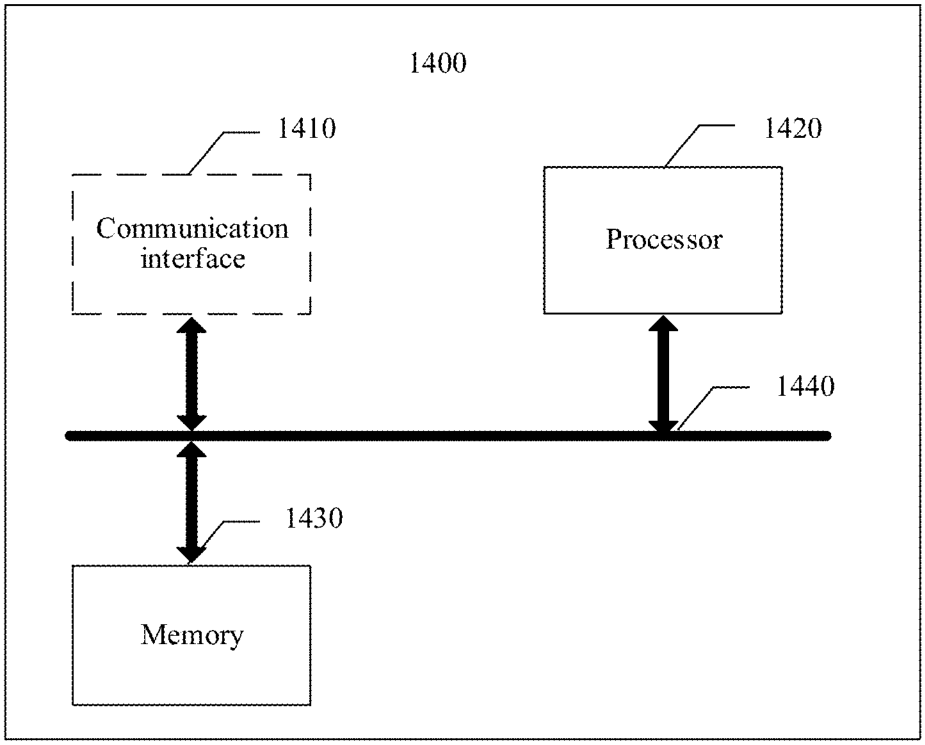
FIG. 14 is a second schematic diagram of a structure of a communication apparatus according to an embodiment of this application.

FIG. 14 shows a communication apparatus 1400 according to an embodiment of this application. The communication apparatus 1400 is configured to implement the functions of the MT of the first node in the foregoing methods. The apparatus may be the MT of the first node, or may be an apparatus in the MT of the first node or an apparatus that can be used in matching with the MT of the first node. The apparatus may be a chip system. In this embodiment of this application, the chip system may include a chip, or may include a chip and another discrete device. The communication apparatus 1400 includes at least one processor 1420, configured to implement the functions of the MT of the first node in the methods provided in the embodiments of this application. The communication apparatus 1400 may further include a communication interface 1410. In this embodiment of this application, the communication interface may be a transceiver, a circuit, a bus, a module, or a communication interface of another type, and is configured to communicate with another device by using a transmission medium. For example, the communication interface 1410 is used by an apparatus in the communication apparatus 1400 to communicate with another device. For example, when the communication apparatus 1400 is the MT of the first node, the other apparatus may be a second node. The transceiver may include a receiver and a transmitter. The receiver is configured to implement the receiving operations in the method embodiments, and the transmitter is configured to implement the sending operations in the method embodiments.

The communication apparatus 1400 may further include at least one memory 1430, configured to store a program, instructions, and/or data. The memory 1430 is coupled to the processor 1420. The coupling in this embodiment of this application may be an indirect coupling or a communication connection between apparatuses, units, or modules in an electrical form, a mechanical form, or another form, and is used for information exchange between the apparatuses, the units, or the modules. The processor 1420 may operate in cooperation with the memory 1430. The processor 1420 may execute the program or instructions stored in the memory 1430. At least one of the at least one memory may be included in the processor.

When invoking the program or instructions in the memory 1430, the processor 1420 may implement the following operations:

obtaining transmission resource configurations, where the transmission resource configurations include a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and determining, according to a specified rule, one or more of the following: whether to perform uplink sending on a first time domain resource in the transmission resource configurations, whether to perform downlink receiving on a second time domain resource in the transmission resource configurations, whether to send an uplink signal on a third time domain resource in a reference configuration, or whether to receive a downlink signal on a fourth time domain resource in the reference configuration, where the first time domain resource is an uplink time domain resource, the second time domain resource is a downlink time domain resource, and the reference configuration is at least one of the first configuration and the second configuration. The processor 1420 may further implement another method performed by the MT of the first node in the foregoing method embodiments.

The processor 1420 sends/receives data by using the communication interface 1410.

The processor 1420 may further perform operations other than sending or receiving in the foregoing method embodiments.

A connection medium between the communication interface 1410, the processor 1420, and the memory 1430 is not limited in this embodiment of this application. In this embodiment of this application, the memory 1430, the processor 1420, and the communication interface 1410 are connected to each other by using a bus 1440 in FIG. 14. The bus is represented by using a thick line in FIG. 14. This is merely an example for description, and is not used as a limitation. Another connection manner between components may be used. The bus may be classified as an address bus, a data bus, a control bus, or the like. For ease of representation, only one thick line is used to represent the bus in FIG. 14, but this does not mean that there is only one bus or only one type of bus.

In this embodiment of this application, the processor may be a general purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in the embodiments of this application. The general purpose processor may be a microprocessor, any conventional processor, or the like. The operations of the methods disclosed with reference to the embodiments of this application may be directly performed by a hardware processor, or may be performed by a combination of hardware in the processor and a software module.

In this embodiment of this application, the memory may be a nonvolatile memory, for example, a hard disk drive (HDD) or a solid-state drive (SSD), or may be a volatile memory, for example, a random access memory (RAM). The memory is any other medium that can carry or store expected program code in a form of an instruction or a data structure and that can be accessed by a computer, but is not limited thereto. The memory in this embodiment of this application may be alternatively a circuit or any other apparatus that can implement a storage function, and is configured to store the program, instructions, and/or data.

When the communication apparatus 1300 and the communication apparatus 1400 are chips or chip systems, the communication module 1303 and the communication interface 1410 may output or receive baseband signals. When the communication apparatus 1300 and the communication apparatus 1400 are devices, the communication module 1303 and the communication interface 1410 may output or receive radio frequency signals.

When the communication apparatus 1300 and the communication apparatus 1400 are chips, the sending operations in the foregoing embodiments correspond to outputting of the chips, and the receiving operations in the foregoing embodiments correspond to inputting of the chip.

An embodiment of this application provides a computer storage medium, storing a computer program. The computer program includes instructions used to perform the communication methods provided in the foregoing embodiments.

An embodiment of this application provides a computer program product including instructions. When the computer program product runs on a computer, the communication methods provided in the foregoing embodiments are performed.

An embodiment of this application further provides a chip. The chip includes a processor and an interface circuit. The interface circuit is coupled to the processor. The processor is configured to run a computer program or instructions, to implement the foregoing communication methods. The interface circuit is configured to communicate with another module outside the chip.

Persons skilled in the art should understand that the embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a function in one or more processes in the flowcharts and/or in one or more blocks in the block diagrams.

These computer program instructions may be alternatively stored in a computer-readable memory that can direct a computer or another programmable data processing device to work in a manner, so that the instructions stored in the computer-readable memory generate an artifact that includes an instruction apparatus. The instruction apparatus implements a function in one or more processes in the flowcharts and/or in one or more blocks in the block diagrams.

These computer program instructions may be alternatively loaded onto a computer or another programmable data processing device, so that a series of operations and steps are performed on the computer or the other programmable device to generate computer-implemented processing. Therefore, the instructions executed on the computer or the other programmable device provide operations for implementing a function in one or more processes in the flowcharts and/or in one or more blocks in the block diagrams.

Although example embodiments of this application have been described, persons skilled in the art can make additional changes and modifications to these embodiments once they learn the basic inventive concept. Therefore, the appended claims are intended to be construed as including example embodiments and all changes and modifications falling within the scope of this application.

Clearly, persons skilled in the art can make various modifications and variations to the embodiments of this application without departing from the spirit and scope of the embodiments of this application. In this way, this application is also intended to include these modifications and variations to the embodiments of this application provided that they fall within the scope of the claims of this application and their equivalent technologies.

What is claimed is:

1. A communication method, comprising:

obtaining transmission resource configurations, wherein the transmission resource configurations comprise a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and determining, according to a specified rule, one or more of the following: whether to send an uplink signal on a third time domain resource in a reference configuration, or whether to receive a downlink signal on a fourth time domain resource in the reference configuration, wherein the reference configuration is at least one of the first configuration or the second configuration, wherein the specified rule comprises:

when the third time domain resource is a downlink time domain resource at a resource position of the uplink signal, the uplink signal is not sent on the third time domain resource; and when the fourth time domain resource is an uplink time domain resource at the resource position of the downlink signal, the downlink signal is not received on the fourth time domain resource.

2. The method according to claim 1, wherein the determining, according to the specified rule, whether to send the uplink signal on the third time domain resource comprises:

determining, based on the reference configuration and the resource position of the uplink signal, whether to send the uplink signal on the third time domain resource.

3. The method according to claim 1, wherein the specified rule comprises:

when the third time domain resource is an uplink time domain resource at the resource position of the uplink signal, the uplink signal is allowed to be sent on the third time domain resource.

4. The method according to claim 1, wherein the determining, according to the specified rule, whether to receive the downlink signal on the fourth time domain resource comprises:

determining, based on the reference configuration and a resource position of the downlink signal, whether to receive the downlink signal on the fourth time domain resource.

5. The method according to claim 1, wherein the specified rule comprises:

when the fourth time domain resource is a downlink time domain resource at the resource position of the downlink signal, the downlink signal is allowed to be received on the fourth time domain resource.

6. The method according to claim 1, further comprising:

determining, according to the specified rule, at least one of: whether to perform uplink sending on a first time domain resource in the transmission resource configurations, or whether to perform downlink receiving on a second time domain resource in the transmission resource configurations, wherein the first time domain resource is an uplink time domain resource, the second time domain resource is a downlink time domain resource, and wherein the specified rule comprises:

when the first time domain resource is located at the resource position of the downlink signal, uplink sending is not performed on the first time domain resource; and/or when the first time domain resource is not located at the resource position of the downlink signal, uplink sending is allowed to be performed on the first time domain resource.

7. The method according to claim 6, wherein the specified rule comprises:

when the second time domain resource is located at the resource position of the uplink signal, downlink receiving is not performed on the second time domain resource; and/or when the second time domain resource is not located at the resource position of the uplink signal, downlink receiving is performed on the second time domain resource.

8. The method according to claim 1, wherein the downlink signal comprises any one or more of the following: a channel state information-reference signal (CSI-RS), a tracking reference signal (TRS), a physical downlink control channel (PDCCH) search space, a control resource set, or a synchronization signal/physical broadcast channel (SS/PBCH).

9. The method according to claim 8, wherein when the downlink signal comprises any one or more of a CSI-RS, a TRS, a PDCCH search space, or a control resource set, a reference configuration complies with any one of the following: the reference configuration is the first configuration, the reference configuration is the second configuration, the reference configuration is the first configuration and the second configuration, or the reference configuration is indicated by an upper-level node; or when the downlink signal is an SS/PBCH, the reference configuration is the first configuration.

10. The method according to claim 9, wherein that the reference configuration is the first configuration and the second configuration comprises:

when both the first configuration and the second configuration are downlink time domain resources at a position of the downlink signal, the downlink signal is allowed to be received.

11. The method according to claim 1, wherein the uplink signal comprises a physical random access channel (PRACH) or a sounding reference signal (SRS).

12. The method according to claim 11, wherein when the uplink signal is a PRACH, a reference configuration complies with any one of the following: the reference configuration is the first configuration, the reference configuration is the second configuration, the reference configuration is the first configuration and the second configuration, or the reference configuration is indicated by an upper-level node; or when the uplink signal is an SRS, the reference configuration is the first configuration.

13. The method according to claim 12, wherein that the reference configuration is the first configuration and the second configuration comprises:

when both the first configuration and the second configuration are uplink time domain resources at a position of the uplink signal, the uplink signal is allowed to be sent.

14. The method according to claim 1, wherein the method further comprises:

receiving a slot format indicator (SFI), wherein an indication function of the SFI comprises any one of the following: being used to indicate a flexible time domain resource in the first configuration, being used to indicate a flexible time domain resource in the second configuration, or being used to indicate the flexible time domain resource in the first configuration and the flexible time domain resource in the second configuration.

15. The method according to claim 14, wherein the SFI comprises an indication field, and the indication field is used to indicate the indication function of the SFI.

16. The method according to claim 14, wherein the method further comprises:

receiving radio resource control (RRC) signaling from a donor node, wherein the RRC signaling comprises the indication function of the SFI; or receiving medium access control (MAC) signaling from an upper-level node, wherein the MAC signaling comprises the indication function of the SFI.

17. The method according to claim 14, wherein if the SFI is used to indicate the flexible time domain resource in the first configuration and the flexible time domain resource in the second configuration, the SFI complies with any one or more of the following rules:

when both the first configuration and the second configuration are downlink time domain resources on the first time domain resource, the SFI is not expected to indicate that the first time domain resource is an uplink time domain resource;

when both the first configuration and the second configuration are uplink time domain resources on the second time domain resource, the SFI is not expected to indicate that the second time domain resource is a downlink time domain resource; or when the first configuration is an uplink time domain resource on the third time domain resource and the second configuration is a downlink time domain resource on the third time domain resource, or when the first configuration is a downlink time domain resource on the third time domain resource and the second configuration is an uplink time domain resource on the third time domain resource, the SFI is not expected to indicate that the third time domain resource is a flexible time domain resource.

18. A communication apparatus, comprising:

a processor, configured to obtain transmission resource configurations, wherein the transmission resource configurations comprise a first configuration and a second configuration, the first configuration indicates that a start time domain resource is a downlink time domain resource and/or an end time domain resource is an uplink time domain resource in one configuration period, and the second configuration indicates that a start time domain resource is an uplink time domain resource and/or an end time domain resource is a downlink time domain resource in one configuration period; and determine, according to a specified rule, one or more of the following: whether to send an uplink signal on a third time domain resource in a reference configuration, or whether to receive a downlink signal on a fourth time domain resource in the reference configuration, wherein the reference configuration is at least one of the first configuration or the second configuration, wherein the specified rule comprises:

when the third time domain resource is a downlink time domain resource at a resource position of the uplink signal, the uplink signal is not sent on the third time domain resource; and when the fourth time domain resource is an uplink time domain resource at the resource position of the downlink signal, the downlink signal is not received on the fourth time domain resource.

19. The apparatus according to claim 18, wherein when determining, according to the specified rule, whether to send the uplink signal on the third time domain resource, the processor is configured to:

determine, based on the reference configuration and the resource position of the uplink signal, whether to send the uplink signal on the third time domain resource.

20. The apparatus according to claim 18, wherein the specified rule comprises:

when the third time domain resource is an uplink time domain resource at the resource position of the uplink signal, the uplink signal is allowed to be sent on the third time domain resource.

* * * * *